(12) United States Patent
Ohashi

(10) Patent No.: US 7,535,650 B2
(45) Date of Patent: May 19, 2009

(54) ZOOM LENS, IMAGE PICKUP APPARATUS, AND PERSONAL DIGITAL ASSISTANT

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/984,958

(22) Filed: Nov. 26, 2007

(65) Prior Publication Data
US 2008/0151385 A1 Jun. 26, 2008

(30) Foreign Application Priority Data
Nov. 27, 2006 (JP) ............... 2006-318743
Apr. 18, 2007 (JP) ............... 2007-109635

(51) Int. Cl.
G02B 9/14 (2006.01)

(52) U.S. Cl. .................. 359/676; 359/708; 359/740; 359/787

(58) Field of Classification Search .................. 359/432, 359/676, 708, 733, 740, 787; 348/335, 345
See application file for complete search history.

(56) References Cited

U.S. PATENT DOCUMENTS

| 5,153,779 | A | 10/1992 | Ohashi |
| 5,398,135 | A | 3/1995 | Ohashi |
| 5,576,891 | A | 11/1996 | Ohashi |
| 5,581,319 | A | 12/1996 | Ohashi |
| 5,617,254 | A | 4/1997 | Ohashi |
| 5,630,188 | A | 5/1997 | Ohashi |
| 5,687,401 | A | 11/1997 | Kawamura et al. |
| 5,930,056 | A | 7/1999 | Ohashi |
| 6,353,506 | B1 | 3/2002 | Ohashi |
| 6,525,885 | B2 | 2/2003 | Ohashi |
| 6,747,818 | B2 | 6/2004 | Ohashi et al. |
| 6,771,433 | B2 | 8/2004 | Ohashi |
| 6,829,102 | B2 | 12/2004 | Ohashi et al. |
| 6,839,183 | B2 | 1/2005 | Ohashi |
| 6,839,185 | B2 | 1/2005 | Ohashi |
| 6,995,921 | B2 | 2/2006 | Ohashi |
| 7,002,755 | B2 | 2/2006 | Mihara et al. |
| 7,038,858 | B2 | 5/2006 | Ohashi |
| 7,057,659 | B1 * | 6/2006 | Mihara et al. ............... 348/345 |
| 7,095,564 | B2 | 8/2006 | Ohashi |

(Continued)

FOREIGN PATENT DOCUMENTS

JP 2004-102211 4/2004

(Continued)

Primary Examiner—Joseph Martinez
(74) Attorney, Agent, or Firm—Dickstein Shapiro LLP

(57) ABSTRACT

A zoom lens, in order from an object side, includes a first lens group having a negative refracting power, a second lens group having a positive refracting power and an aperture stop. When zooming from a wide-angle end to a telephoto end, at least the first lens group and the second lens group move, so that an interval between the first lens group and the second lens group can become small and an interval between the second lens group and an image plane can become large. The second lens group has at least three positive lenses and two negative lenses and at least one of the three positive lenses is an aspheric positive lens and an Abbe's number of the glass type: $\nu_d$ and an anomalous dispersion of the glass type: $\Delta\theta_{g,F}$ satisfy conditions:

$$\nu_d > 80.0 \quad (1)$$

$$\nu\theta_{g,F} > 0.025 \quad (2).$$

17 Claims, 13 Drawing Sheets

U.S. PATENT DOCUMENTS

| | | |
|---|---|---|
| 7,151,638 B2 | 12/2006 | Ohashi |
| 7,164,542 B2 | 1/2007 | Ohashi |
| 7,167,320 B2 | 1/2007 | Ohashi |
| 7,227,700 B2 | 6/2007 | Oshita |
| 2005/0094002 A1 | 5/2005 | Ohashi |
| 2005/0270663 A1 | 12/2005 | Ohashi |
| 2006/0017836 A1 | 1/2006 | Nuno et al. |
| 2006/0262422 A1 | 11/2006 | Ohashi |
| 2007/0097517 A1 | 5/2007 | Ohashi |

FOREIGN PATENT DOCUMENTS

| | | |
|---|---|---|
| JP | 2005-024804 | 1/2005 |
| JP | 2006-113554 | 4/2006 |

* cited by examiner

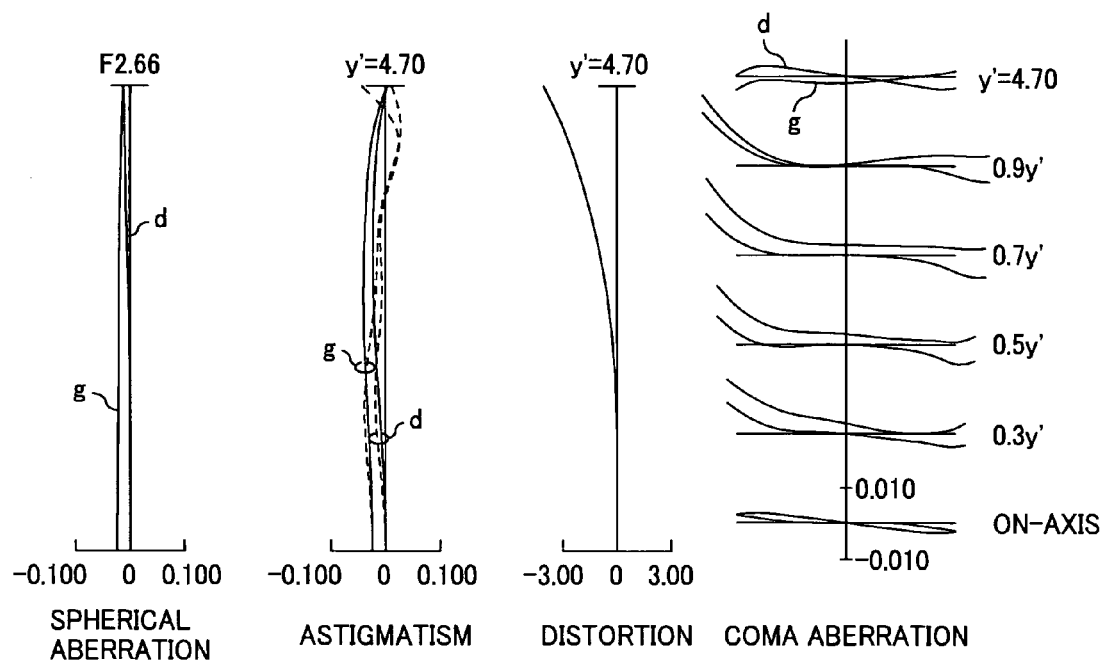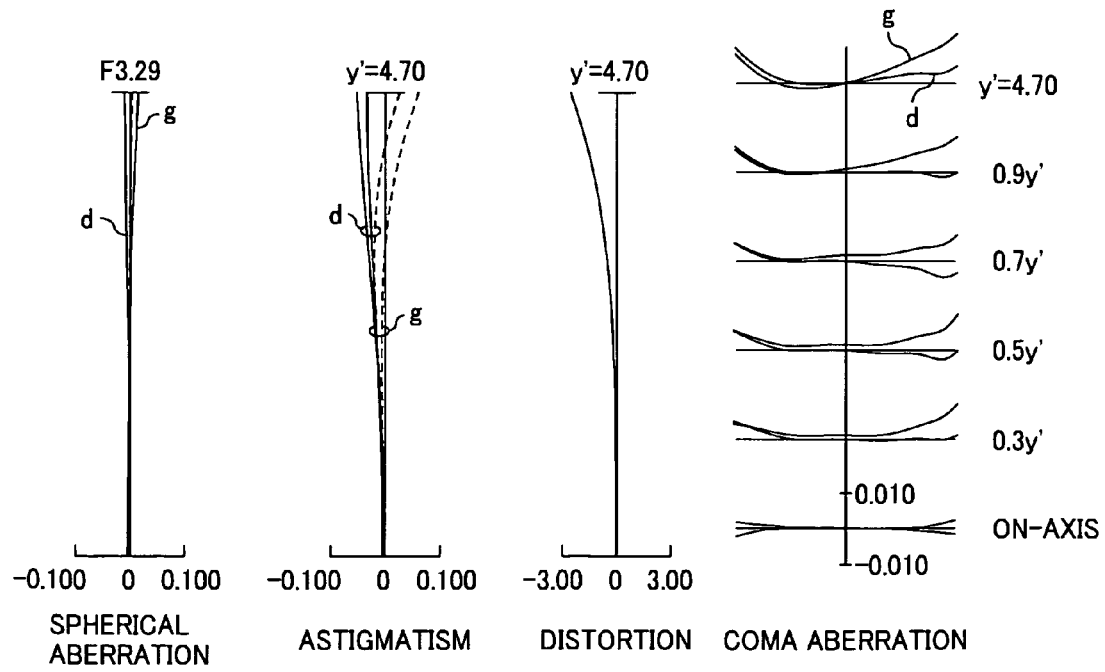

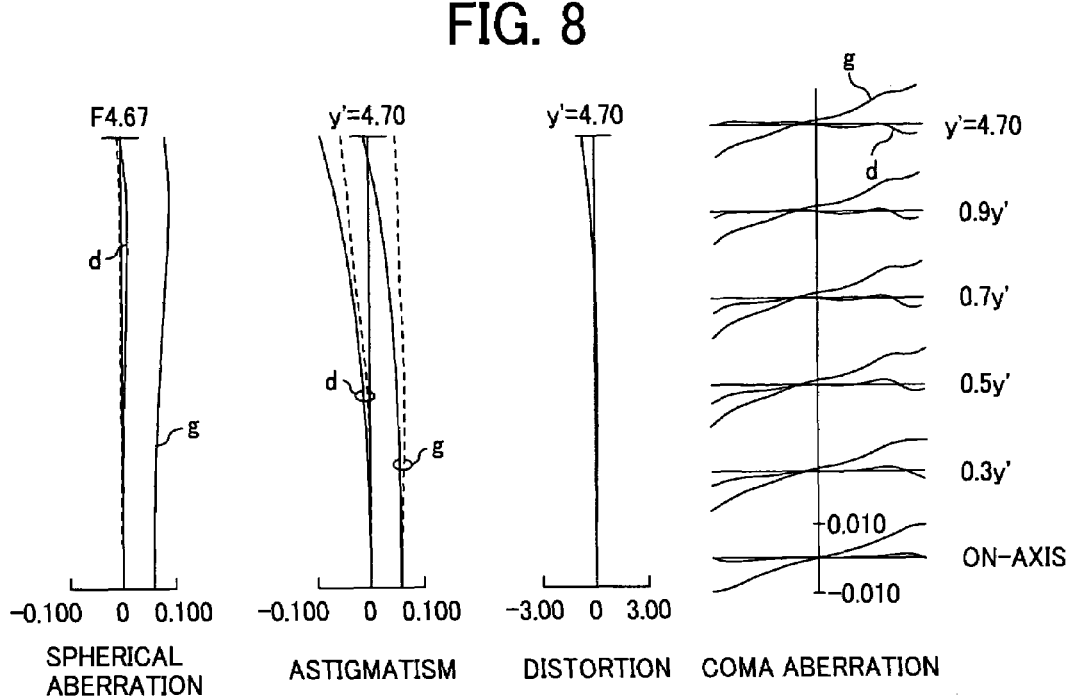
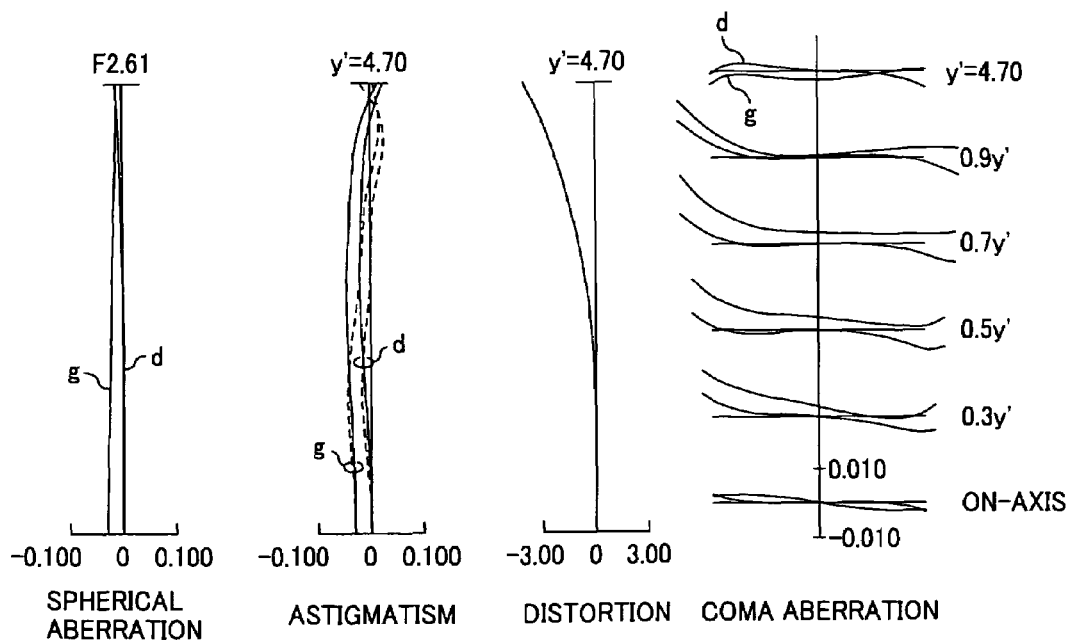

ZOOM LENS, IMAGE PICKUP APPARATUS, AND PERSONAL DIGITAL ASSISTANT

CROSS REFERENCE TO RELATED APPLICATION

The present application is based on and claims priority from Japanese Patent Application Numbers, 2006-318743, filed Nov. 27, 2006 and 2007-109635, filed Apr. 18, 2007, the disclosures of which are hereby incorporated by reference herein in their entirety.

BACKGROUND

1. Field of the Invention

This invention relates to a zoom lens, an image pickup apparatus and a personal digital assistant (PDA).

2. Description of the Related Art

Image pickup apparatuses such as digital cameras have been widely used. There are needs for a higher photographing image quality of those image pickup apparatuses and a much smaller size of the main body of the devices. And also there are needs for both a higher quality and a smaller size of a zoom lens used as a photographing lens.

Regarding miniaturization of a zoom lens, it is necessary that an entire length of a zoom lens (a distance between the nearest to an object side of a lens surface and an image plane) becomes shorter when using a zoom lens. And it is also important that the thickness of each lens group is reduced and the entire length of the lens remains reduced when it is stored. Additionally, regarding a higher performance of a zoom lens, in recent years there have been needs for a zoom lens offering a resolution corresponding to at least an image sensor having 8 to 10 million pixels for an entire zooming range. There are many users who desire a photographing lens with a wider field angle. There are also many users who desire a zoom lens which has a half field angle at a short focal length end (a wide-angle end) preferably equal to or more than 38 degrees or equal to or more than 42 degrees. The half field angles of 38 degrees and 42 degrees are each equal to 28 mm and 24 mm of focal lengths for a silver-halide 35 mm camera (so-called the Leica format).

BACKGROUND

As a lens type suitable for being a small size, and also suitable for a digital camera and for its smaller-sized zoom lens, in order from an object side, there is a zoom lens that has a first lens group having a negative refracting power, a second lens group having a positive refracting power, a third lens group having a positive refracting power and an aperture which is at an object side of the second lens group, moving integrally with the second lens group. When this zoom lens zooms from a wide-angle end to a telephoto end, at least the first lens group and the second lens group move, so that an interval between the first lens group and the second lens group can become small and an interval between the second lens group and the third lens group can become large. These types of zoom lenses are well-known. A zoom lens like this type has at least three positive lenses and two negative lenses in the second lens group and low dispersion glass having an Abbe's number of 80 or more is used as positive lenses of the second lens group. These types of lenses according to Japanese Patent Publication Numbers 2004-102211, 2006-113554 and 2005-24804 are known.

SUMMARY

In a zoom lens according to Japanese Patent Publication Number 2004-102211, low dispersion glass having an Abbe's number of 80 or more is used as positive lenses of a second lens group. Miniaturization is achieved by providing an aspheric surface. In a zoom lens according to Japanese Patent Publication Number 2006-113554, three positive lenses and two negative lenses are used for a second lens group, which achieves equal to or more than 43 degrees for a half field angle at a wide-angle end. To correct a chromatic aberration of magnification well, low dispersion glass having an Abbe's number of 80 or more is used as negative lenses for a first lens group. Low dispersion glass having an Abbe's number of 80 or more used for Japanese Patent Publication Numbers 2004-102211 and 2006-113554 is called special low dispersion glass and is expensive, however it is an effective material to correct a chromatic aberration of magnification. Especially, to achieve a wide field angle at a wide-angle end, it is necessary to decrease a secondary spectrum of a chromatic aberration of magnification which increases corresponding to providing a wide field angle. In the case like this, use of special dispersion glass is effective. In a zoom lens according to Japanese Patent Publication Number 2004-102211, though special dispersion glass is used for the second lens group, a half field angle at a wide-angle end is only less than 33 degrees in a particular embodiment. The use of special dispersion glass does not work sufficiently to provide a wide-angle.

A zoom lens according to Japanese Patent Application Number 2006-113554 achieves a wide field angle, so that a half field angle at a wide-angle end becomes equal to or more than 43 degrees. However, expensive special dispersion glass is used for the first lens group of large diameter lenses and because of the large diameter of the lens, the zoom lens, itself, costs considerably more. Low dispersion glass of the Abbe's number of 80 or more used as positive lenses for the second lens group is used in a fourth embodiment of Japanese Patent Publication Number 2005-24804 and thereby both an axial chromatic aberration and a chromatic aberration of magnification are corrected well. However, also in this case, the half field angle at a wide-angle end is about 39 degrees and it does not achieve 42 degrees.

SUMMARY

An object of the invention is to provide a novel zoom lens, an image pickup apparatus using this novel zoom lens and a personal digital assistant using this image pickup apparatus. Especially it is to provide a zoom lens offering a resolution corresponding to an image sensor having 8 to 10 million pixels for an entire zooming range, achieving a half field angle at a wide-angle end equal to or more than 42 degrees that can be provided at low cost, an image pickup apparatus using this zoom lens and a personal digital assistant using this image pickup apparatus.

A zoom lens includes a first lens group having a negative refracting power, a second lens group having a positive refracting power, and including at least three positive lenses and two negative lenses in which at least one of the three positive lenses is an aspheric positive lens, and an aperture provided on an object side of the second lens group and which moves integrally with the second lens group, the first lens group and the second lens group being arranged in this order from the object side to an image side, and at least the first lens group and the second lens group being moved when zooming from a wide-angle end to a telephoto end is performed, such that an interval between the first lens group and the second lens group is reduced, and an interval between the second lens group and an image plane is increased, wherein an Abbe's number $v_d$ and an anomalous dispersion $\Delta\theta_{g,F}$ of a glass type of the at least one aspheric positive lens of the three positive lenses of the second lens group satisfy the following conditions, respectively, $$v_d > 80.0 \quad (1)$$

$$\Delta\theta_{g,F} > 0.025 \quad (2)$$

and where $n_g$ is a refracting index to a g-line, $n_F$ is a refracting index to an F-line, $n_c$ is a refracting index to a c-line, $v_d$ is the Abbe's number, and $\Delta\theta_{g,F}$ is the anomalous dispersion, wherein a relative partial dispersion $\theta_{g,F}$ is defined by a condition:

$$\theta_{g,F} = (n_g - n_F)/(n_F - n_c)$$

and wherein the anomalous $\Delta\theta_{g,F}$ is defined as a deflection from a reference line on a two-dimensional coordinate surface, and wherein the two-dimensional coordinate surface is defined by a plane including two perpendicular axes in which the relative partial dispersion $\theta_{g,F}$ is a longitudinal axis and in which the Abbe's number $v_d$ is a lateral axis thereof, and wherein the reference line is defined by a straight line connecting coordinate points ($v_d$=60.49, $\theta_{g,F}$=0.5432) of a reference glass type K7 and coordinate points ($v_d$=36.26, $\theta_{g,F}$=0.5830) of a reference glass type F2.

Preferably, the zoom lens further has a third lens group having a positive refracting power and provided on the image side of the second lens group, and wherein at least the first lens group and the second lens group are moved when the zooming from the wide-angle end to the telephoto end is performed, such that the interval between the first lens group and the second lens group is reduced, and an interval between the second lens group and the third lens group is increased.

Preferably, the third lens group includes one positive lens.

Preferably, the one positive lens of the third lens group is an aspheric positive lens, and an Abbe's number $v_d$ and an anomalous dispersion $\Delta\theta_{g,F}$ of a glass type of the aspheric positive lens of the one positive lens satisfy the following conditions, respectively, $$v_d > 80.0 \quad (1)$$

$$\Delta\theta_{g,F} > 0.025 \quad (2)$$

Preferably, a distance dS–L on an optical axis from the aperture stop to a surface in the second lens group which is the nearest to the image side, and a distance dS–A on the optical axis from the aperture to an aspheric surface in the second lens group which is the nearest to the image side, satisfy a condition:

$$0.75 < dS-A/dS-L \leq 1.0 \quad (3)$$

Preferably, a focal length f2 of the second lens group, and a focal length fA of an aspheric surface of the second lens group on the image side, satisfy a condition:

$$0.4 < fA/f2 < 1.0 \quad (4)$$

Preferably, the aspheric positive lens including the glass type, which satisfies the conditions (1) and (2), has a resin layer on at least one of optical surfaces thereof, and is a hybrid aspheric lens in which an air contact surface of the resin layer forms a shape of an aspheric surface.

Preferably, a center thickness tA of the entire hybrid aspheric lens, and a center thickness tR of the resin layer satisfy a condition:

$$0.01 < tR/tA < 0.1 \quad (5)$$

Preferably, a paraxial curvature radius rA of the aspheric surface as the air contact surface of the resin layer in the hybrid aspheric lens, and a curvature radius rB of a spherical surface where the resin layer is formed, satisfy a condition:

$$0.5 < rB/rA < 1.4 \quad (6)$$

Preferably, the second lens group further includes at least one aspheric lens, besides the aspheric positive lens including the glass type which satisfies the conditions (1) and (2).

Preferably, the at least one aspheric positive lens is disposed in a position in the second lens group nearest to the image side, and the at least one aspheric lens is disposed in a position in the second lens group nearest to the object side.

Preferably, the at least one aspheric positive lens is disposed in a position in the second lens group nearest to the image side, and is cemented with the negative lens which is disposed on the object side thereof and disposed adjacent thereto.

Preferably, the zoom lens has a resolution corresponding to an image sensor including 8 to 10 million pixels or more, and wherein a half-field angle in the wide-angle end is equal to or more than 42 degrees.

Preferably, an image pickup apparatus includes a zoom lens, as a photographing zoom lens including a first lens group having a negative refracting power, a second lens group having a positive refracting power, and including at least three positive lenses and two negative lenses in which at least one of the three positive lenses is an aspheric positive lens, and an aperture provided on an object side of the second lens group and which moves integrally with the second lens group, the first lens group and the second lens group being arranged in this order from the object side to an image side, and at least the first lens group and the second lens group being moved when zooming from a wide-angle end to a telephoto end is performed, such that an interval between the first lens group and the second lens group is reduced, and an interval between the second lens group and an image plane is increased, and wherein an Abbe's number $v_d$ and an anomalous dispersion $\Delta\theta_{g,F}$ of a glass type of the at least one aspheric positive lens of the three positive lenses of the second lens group satisfy the following conditions, respectively:

$$v_d > 80.0 \quad (1)$$

$$\Delta\theta_{g,F} > 0.025 \quad (2)$$

and where $n_g$ is a refracting index to a g-line, $n_F$ is a refracting index to an F-line, $n_c$ is a refracting index to a c-line, $v_d$ is the Abbe's number, and $\Delta\theta_{g,F}$ is the anomalous dispersion, wherein a relative partial dispersion $\theta_{g,F}$ is defined by a condition:

$$\theta_{g,F} = (n_g - n_F)/(n_F - n_c)$$

and wherein the anomalous dispersion $\Delta\theta_{g,F}$ is defined as a deflection from a reference line on a two-dimensional coordinate surface, and wherein the two-dimensional coordinate surface is defined by a plane including two perpendicular axes in which the relative partial dispersion $\theta_{g,F}$ is a longitudinal axis and in which the Abbe's number $v_d$ is a lateral axis thereof, and wherein the reference line is defined by a straight line connecting coordinate points ($v_d$=60.49, $\theta_{g,F}$=0.5432) of a reference glass type K7 and coordinate points ($v_d$=36.26, $\theta_{g,F}$=0.5830) of a reference glass type F2.

Preferably, a color image sensor is used as the image sensor.

Preferably, the image pickup apparatus has a resolution corresponding to the image sensor including 8 to 10 million pixels or more, and wherein a half-field angle in the wide-angle end is equal to or more than 42 degrees.

Preferably, a personal digital assistant, includes an image pickup apparatus including a zoom lens, as a photographing zoom lens, has a first lens group having a negative refracting power, a second lens group having a positive refracting power, and including at least three positive lenses and two negative lenses in which at least one of the three positive lenses is an aspheric positive lens, and an aperture provided on an object side of the second lens group and which moves integrally with the second lens group, the first lens group and the second lens group being arranged in this order from the object side to an image side, and at least the first lens group and the second lens group being moved when zooming from a wide-angle end to a telephoto end is performed, such that an interval between the first lens group and the second lens group is reduced, and an interval between the second lens group and an image plane is increased, and wherein an Abbe's number $v_d$ and an anomalous dispersion $\Delta\theta_{g,F}$ of a glass type of the at least one aspheric positive lens of the three positive lenses of the second lens group satisfy the following conditions, respectively:

$$v_d > 80.0 \quad (1)$$

$$\Delta\theta_{g,F} > 0.025 \quad (2)$$

and where $n_g$ is a refracting index to a g-line, $n_F$ is a refracting index to an F-line, $n_c$ is a refracting index to a c-line, $v_d$ is the Abbe's number, and $\Delta\theta_{g,F}$ is the anomalous dispersion, and wherein a relative partial dispersion $\Delta\theta_{g,F}$ is defined by a condition:

$$\Delta\theta_{g,F} = (n_g - n_F)/n_F - n_c)$$

and wherein the anomalous dispersion $\Delta\theta_{g,F}$ is defined as a deflection from a reference line on a two-dimensional coordinate surface, and wherein the two-dimensional coordinate surface is defined by a plane including two perpendicular axes in which the relative partial dispersion $\theta_{g,F}$ is a longitudinal axis and in which the Abbe's number $v_d$ is a lateral axis thereof, and wherein the reference line is defined by a straight line connecting coordinate points ($v_d$=60.49, $\theta_{g,F}$=0.5432) of a reference glass type K7 and coordinate points ($v_d$36.26, $\theta_{g,F}$=0.5830) of a reference glass type F2.

BRIEF DESCRIPTION OF THE DRAWINGS

FIG. 6 is an aberration diagram at a short focal length end according to the first embodiment.

FIG. 7 is an aberration diagram at a middle focal length according to the first embodiment.

FIG. 8 is an aberration diagram at a long focal length end according to the first embodiment.

FIG. 9 is an aberration diagram at a short focal length end according to the second embodiment.

DETAILED DESCRIPTION

Figure 1:
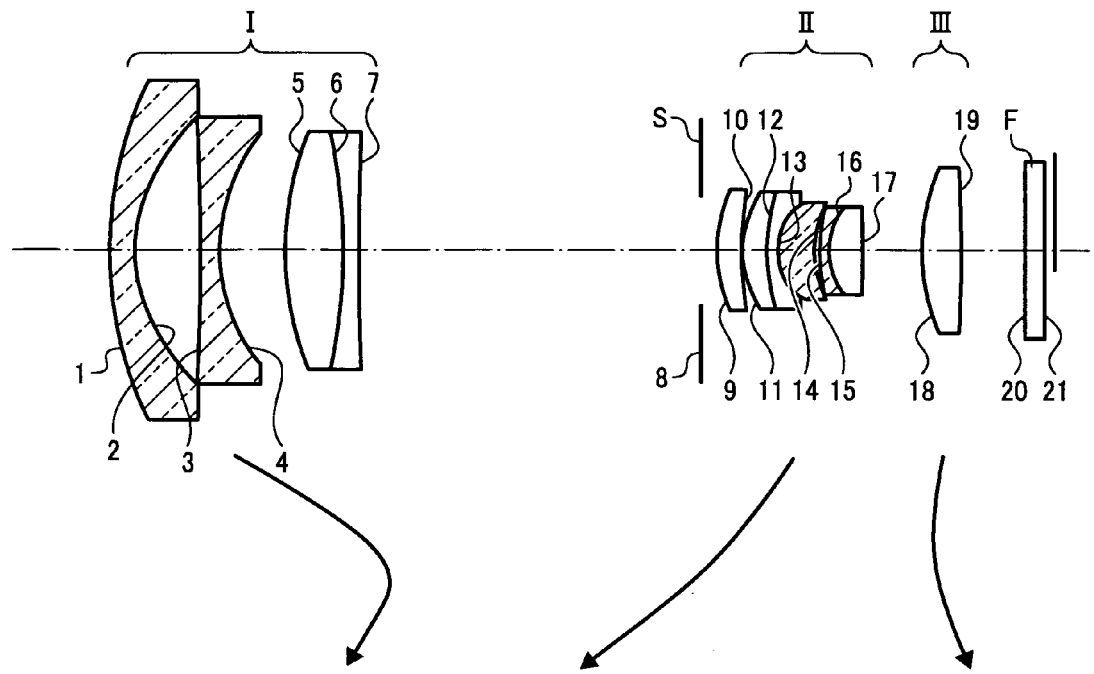
FIG. 1 is a cross-sectional view illustrating a construction of a zoom lens and its displacement along with zooming according to first embodiment.

Hereinafter, a description of embodiments will be explained.

A zoom lens according to an embodiment, in order from an object side, at least has a first lens group having a negative refracting power, a second lens group having a positive refracting power and an aperture (or a stop, or an aperture stop, or a diaphragm) at an object side of the second lens group, moving integrally with the second lens group, and when zooming from a wide-angle end to a telephoto end, at least the first lens group and the second lens group move, so that an interval between the first lens group and the second lens group becomes small and an interval between the second lens group and an image plane becomes large, and also has following characteristics.

The second lens group has at least three positive lenses and two negative lenses and at least one of the three positive lenses is an aspheric positive lens. This, the at least one aspheric positive lens, an Abbe's number of the glass type: $v_d$ and an anomalous dispersion of the glass type: $\Delta\theta_{g,F}$ satisfy conditions:

$$v_d > 80.0 \quad (1)$$

$$\Delta\theta_{g,F} > 0.025 \quad (2)$$

A relative partial dispersion: $\theta_{g,F}$ is defined by a following expression: $\theta_{g,F} = (n_g - n_F)/(n_F - n_c)$, by each refracting index to g-line of glass type: $n_g$, F-line of glass type: $n_F$ and c-line of glass type: $n_c$. A two-dimensional coordinate surface is defined by a plane which includes two perpendicular axes which are the defined relative partial dispersion: $\theta_{g,F}$ as a longitudinal axis and the Abbe's number: $\nu_d$ as a lateral axis, and a reference line is defined as a straight line connecting coordinate points of K7 as a reference glass type: ($\nu_d$=60.49, $\theta_{g,F}$=0.5432) and coordinate points of F2 as a reference glass type: ($\nu_d$=36.26, $\theta_{g,F}$=0.5830). An anomalous dispersion of glass type: $\Delta\theta_{g,F}$ is defined as a deflection from the reference line on the two-dimensional coordinate surface of the relative partial dispersion of glass type: $\theta_{g,F}$.

The anomalous dispersion above: $\Delta\theta_{g,F}$ is a distance in parallel to a longitudinal axis direction between the coordinate points on the two-dimensional coordinate surface of the glass type and the reference line. The relative partial dispersion: $\theta_{g,F}$ is a physical quantity defined by a glass type. The reference line as described above is a straight line such that, on the two-dimensional coordinate surface, the reference glass type's coordinate points of a relative partial dispersion of K7: $\theta_{g,F}$ (K7: 0.5432) and an Abbe's number of K7: $\nu_d$ (K7: 60.49) are each an ordinate and an abscissa, are connected with the reference glass type's coordinate points of a relative partial dispersion of F2: $\theta_{g,F}$ (F2: 0.5830) and an Abbe's number of F2: $\nu_d$ (F2: 36.26) are each an ordinate and an abscissa.

For example, in particular, a product name of the reference glass type: K7 is NSL7 of OHARA INC. and a product name of the reference glass type: F2 is PBM2 of OHARA INC.

A minimum construction of lens groups is possible to be two lens groups such as the first lens group and the second lens group. At an image side of the second lens group having a positive refracting power, it is possible to further have a third lens group having a positive refracting power and also have subsequent lens groups such as a fourth lens group and so on after the third lens group unless miniaturization of an entire zoom lens is prevented.

A preferable example of a zoom lens has a third lens group having a positive refracting power at an image side of the second lens group having a positive refracting power, and has such a construction that, when zooming from a wide-angle end to a telephoto end, at least the first lens group and the second lens group move, so that an intereval between the first lens group and the second lens group can become small and an interval between the second lens group and the third lens group can become large.

A zoom lens is possible to have a third lens group including one positive lens. In this case, one positive lens of the third lens group is an aspheric positive lens, and an Abbe's number of the glass type: $\nu_d$ and an anomalous dispersion of the glass type: $\Delta\theta_{g,F}$ preferably satisfy conditions:

$$\nu_d > 80.0 \quad (1)$$

$$\Delta\theta_{g,F} > 0.025 \quad (2)$$

Regarding a zoom lens, an optical axial distance between an aperture and a surface of the nearest to the image side of a second lens group: dS–L, and an optical axial distance between an aperture and an aspheric surface of the nearest to an image side of the second lens group: dS–A preferably satisfy a condition:

$$0.75 < dS-A/dS-L \leq 1.0 \quad (3)$$

Regarding a zoom lens, a focal length of the second lens group: f2, and a focal length of an aspheric lens at an image side of the second lens group: fA preferably fulfill a condition:

$$0.4 < fA/f2 < 1.0 \quad (4)$$

In this case, the focal length fA is the maximum one of those if there are more than two aspheric lenses in the second lens group.

Regarding a zoom lens, aspheric positive lenses in a second lens group or in a third lens group including the glass type satisfying conditions (1) and (2) have a thin resin layer on at least one of the optical surfaces. The aspheric positive lenses are preferably hybrid aspheric lenses on which an air contact surface of this resin layer is an aspheric surface shape.

Regarding a hybrid aspheric lens in a zoom lens, the center thickness of an entire hybrid aspheric lens: tA and the center thickness of a resin layer: tR preferably fulfill a condition:

$$0.01 < tR/tA < 0.1 \quad (5)$$

Regarding a hybrid aspheric lens in a zoom lens, a paraxial curvature radius of an aspheric surface which is an air contact surface of the resin layer: rA and a curvature radius of a spherical surface where the resin layer is formed: rB preferably fulfill a condition:

$$0.5 < rB/rA < 1.4 \quad (6)$$

A zoom lens allows a second lens group to have at least one aspheric lens besides aspheric positive lenses of the glass type satisfying conditions (1) and (2). In this case, one aspheric positive lens in the second lens group is arranged nearest to the image side of the second lens group and an aspheric lens is preferably arranged nearest to the object side of the second lens group.

One aspheric positive lens of the second lens group in a zoom lens is arranged nearest to the image side of the second lens group and is possible to be joined to a negative lens which is arranged adjacently at an object side of the aspheric positive lens.

This zoom lens is possible to have equal to or more than 42 degrees of a half field angle at a wide-angle end and have a resolution corresponding to an image sensor having 8 to 10 million pixels or more for an entire zooming range.

A zoom lens according to this invention is used for an image pickup apparatus as a photographing zoom lens. An image sensor of an image pickup apparatus is a color image sensor.

The image pickup apparatus has the number of pixels of the image sensor equal to or more than 8 to 10 million pixels.

A personal digital assistant (PDA) according to this invention has an image pickup apparatus having a zoom lens according to this invention.

For example, in a zoom lens according to an embodiment of this invention such as a zoom lens having two lens groups, in order from an object side, including negative and positive lens groups, generally, when zooming from a wide-angle end to a telephoto end, a second lens group moves monotonously from an image side to an object side and a first lens group moves to correct an image plane position change along with zooming. To distance an exit pupil from an image plane or to be rear focused, a positive third lens group is possible to be added, however, also in that case, the second lens group performs most of the zooming functions.

To achieve a zoom lens with less varied aberrations and a higher resolution, aberration variations by zooming need to be maintained small, particularly aberrations need to be corrected well in an entire range of zooming of the second lens group as a main group of zooming. Particularly, to achieve a wide field angle at a short focal length end (a wide-angle end), it is necessary to decrease a secondary spectrum of a chromatic aberration of magnification which increases along with becoming a wide field angle and in order to accomplish this object a construction of the second lens group is also important.

Generally, corrections of an axial chromatic aberration and a chromatic aberration of magnification are done to correspond an image-formation position with two wavelengths in the range of used wavelengths. A chromatic aberration remains within a range of wavelengths sandwiched between the two wavelengths and an outside range of the two wavelengths, and an image-formation position does not always correspond. The secondary spectrum is a residual chromatic aberration.

A visual sensitivity of the human eye is higher at a wavelength in the green range. Therefore, when a chromatic aberration is high in the range of a high wavelength of visual sensitivity, a visual image resolution becomes low due to image blurring.

When photographing by a color image sensor, the same events as described above occur. In general color image sensors having mosaic filters of red, green and blue, 50% of the whole number of pixels have a green filter to ensure resolution. Therefore, an output from pixels in charge of the green range dominates luminance signals formed by signal processing. When a chromatic aberration is high in this wavelength range, the resolution of reproduced images becomes low.

On the other hand, in most color image sensors, a photographic sensitivity in a short wavelength range is relatively higher compared to the human eye and silver-halide color films. Therefore, a color blurring by a chromatic aberration of the blue to purple range stands out easily in reproduced images. In order to decrease a color blurring like this, it is necessary to make a chromatic aberration in the range of blue to purple small. However, when trying to make a chromatic aberration in the range of blue to purple smaller without correcting a secondary spectrum enough, a chromatic aberration in the range of green becomes high and it invites lowering of a resolution of reproduced images as described above.

Thus, corrections of a secondary spectrum of a chromatic aberration have an enormously important role to ensure a resolution of images.

For example, as a construction of a second lens group, conventionally, one designed to correct spherical aberrations and the like by use of aspheric surfaces and another one designed to correct a chromatic aberration by use of low dispersion glass, are known. An embodiment of this invention is characterized in that a construction of the second lens group having an ability of aberration corrections exceeds these conventional examples. In addition, a high-performance zoom lens with a body smaller enough and a wider field angle are achieved without a rise in cost.

That is, in an embodiment of this invention, the construction of the second lens group includes at least three positive lenses and two negative lenses. The construction is that at least one of the positive lenses includes an aspheric positive lens having a positive refracting power and glass types of the aspheric positive lenses satisfy conditions (1) and (2).

Aspheric positive lenses formed by optical materials (glass types) satisfying conditions (1) and (2) are used for the second lens group, so that each of a monochromatic aberration and a chromatic aberration can be decreased in a balanced manner.

However, optical materials satisfying conditions (1) and (2) are generally special low dispersion glass with a low refracting power. To correct aberrations well, it is not enough to just apply aspheric positive lenses. In an embodiment of this invention, the second lens group on the whole has a construction of three positive lenses and two negative lenses, so that a high ability of aberration corrections can be provided.

The construction of the second lens group as described above is particularly effective when a half field angle at a wide-angle end is over 40 degrees. While an occurrence of a monochromatic aberration is restrained enough, it is possible to correct a chromatic aberration of magnification and a color coma aberration, which increase along with becoming a wide field angle, extremely well. By this, for example, it is possible to become a wide field angle fully without using special low dispersion glass for the first lens group of a large lens diameter. In addition, this restrains a cost rise on the whole.

In the condition (1) to be satisfied by glass types of aspheric positive lenses used for the second lens group, when an Abbe's number: $\nu_d$ of the glass types of the aspheric positive lenses is equal to or less than 80.0, a chromatic aberration of magnification is not corrected enough. In the condition (2) to be satisfied by glass types of aspheric positive lenses used for the second lens group, when an anomalous dispersion $\Delta\theta_{g,F}$ is equal to or less than 0.025, a secondary spectrum of a chromatic aberration of magnification remains relatively high and it is difficult both to restrain a color blurring and to ensure a resolution. The positive third lens group is added and a three-lens-group construction of negative, positive and positive lenses is possible. The positive third lens group is added, so that a distance of an exit pupil can be ensured easily and focusing by moving the third lens group can also be possible.

When a third lens group is arranged, the third lens group includes positive lenses facing a large curvature surface to an object side. The third lens group preferably has at least one aspheric surface. If a construction of the third lens group is as described above, the thickness of the third lens group is reduced to the minimum and off-axis aberrations such as astigmatism and the like are corrected better. Moreover, when the third lens group includes one positive lens, low dispersion glass types are preferably used for the purpose of chromatic aberration correction. The third lens group may be fixed when zooming, however, the third lens group moves slightly, so that the degree of freedom of aberration corrections can possibly be increased.

As the third lens group, when the glass type which satisfies conditions (1) and (2), includes one positive lens, this positive lens is the closest to an image plane, light beams per field angles are separate and pass, and a change of a ray path by zooming is small. Therefore, the third lens group has a different function of chromatic aberration correction from an aspheric positive lens of the second lens group, so that an effect of aberration corrections can be enhanced in the entire zooming range.

Condition (3) is a preferred condition to correct an off-axis monochromatic aberration increasing along with becoming a wide field angle, a chromatic aberration of magnification and a color coma aberration better. An aspheric positive lens is at an position relatively close to an aperture stop, that is, when a parameter: dS–A/dS–L is at a position that is equal to or less than 0.75, a height of an off-axis chief ray passing through an aspheric positive lens is not enough, so that it is difficult for both off-axis monochrome aberrations such as an astigmatism and a coma aberration and chromatic aberrations such as a chromatic aberration of magnification and a color coma aberration to be corrected well. In addition, it is obvious that dS–A/dS–L is not over 1.0.

When a parameter of condition (4): fA/f2 is equal to or more than 1.0, a refracting power of an aspheric positive lens is not enough to decrease a secondary spectrum and not enough to correct a chromatic aberration fully. Conversely, when a parameter of condition (4): fA/f2 is equal to or less than 0.4, it is difficult to balance a chromatic aberration correction and a spherical aberration correction. While a secondary spectrum is decreased enough and a chromatic aberration is corrected enough, in order to balance a chromatic aberration correction and a spherical aberration correction well, the parameter: fA/f2 preferably satisfies a slightly narrower condition (4A): 0.5<fA/f2<0.95 than condition (4).

Special low dispersion lenses of an Abbe's number $v_d$ of 80.0 or more are glass types of an aspheric positive lens of the second lens group or an aspheric positive lens of the third lens group. It is difficult to use a molding process for their productions where a die configuration of an aspheric surface is transferred to a glass at high temperature except for highly-miniaturized ones. There is such a process in which glass materials are directly cut and ground to have an aspheric surface, however, this is very unproductive and costly.

It is effective for cost reasons that aspheric positive lenses of the second lens group and aspheric positive lenses of the third lens group produced by glass types satisfying conditions (1) and (2) be composed of hybrid aspheric lenses. Because a hybrid aspheric lens is formed by a thin resin layer on at least one of optical surfaces of a spherical lens where a die configuration of an aspheric surface is transferred such as a hybrid aspheric surface.

Preferred conditions to be satisfied by a hybrid aspheric lens like this are conditions (5) and (6). Spherical lenses are produced easily by inorganic materials such as glass and so on and changes of their characteristics are also small due to environmental changes such as temperature, humidity and etc. However, the changes of characteristics (expansion, shrinkage, changes of refracting index and etc.) of a resin layer used for an aspheric surface part for environmental changes are large compared to a glass lens.

When a parameter of condition (5): tR/tA is equal to or more than 0.1, a resin layer becomes unnecessarily thick and changes of optical characteristics of a zoom lens on the whole due to environmental changes become large and thereby it is hard to assure performance in the usage state. Conversely, when the parameter is equal to or less than 0.01, the resin layer becomes so thin that a shape of an aspheric surface which is necessary to correct aberrations is difficult to be formed.

When a parameter of condition (6): rB/rA is equal to or more than 1.4, the thickness of a resin layer becomes thin at the periphery of a lens and the difference of thickness between the center and the periphery becomes so large that it makes it difficult to produce a shape of an aspheric surface with high accuracy. Conversely, when the parameter is equal to or less than 0.5, the thickness of the resin layer becomes thick at the periphery of the lens and difference of thickness between the center and the periphery also becomes so large that it makes it difficult to produce a shape of an aspheric surface with high accuracy.

In a zoom lens according to an embodiment of this invention, a second lens group preferably has at least one aspheric lens besides an aspheric positive lens, so that both a spherical aberration correction and corrections of an astigmatism and a coma aberration are performed at high level. By adopting a construction as described above, spherical aberrations are mainly corrected on one aspheric surface and astigmatisms and coma aberrations are mainly corrected on another aspheric surface. Therefore, significantly better performance of a zoom lens is possible. In addition, functions of aberration corrections of two aspheric lenses (an aspheric positive lens and another aspheric lens) are separated, so that image performance degradations by decenterings of aspheric lenses can be reduced.

Moreover, an aspheric positive lens is preferably placed nearest to the image side of a second lens group and other aspheric lenses are preferably placed nearest to the object side of the second lens group. It is reasonable that the aspheric positive lens should be placed nearest to the image side of the second lens group in order to raise effects of a chromatic aberration of magnification corrections by low dispersion characteristics. At the same time, an effect of an aspheric surface is possible to play a role of mainly correcting off-axis aberrations such as astigmatisms, coma aberrations and so on. And other aspheric lenses are placed closest position to an aperture stop, so that a role of mainly correcting spherical aberrations can be accomplished effectively as much as possible.

When an aspheric positive lens is placed nearest to the image side of a second lens group, is joined with a negative lens placed adjacently at an object side of the aspheric positive lens and is used, that is, a high-dispersion negative lens is placed at the object side of the aspheric positive lens, astigmatisms and color coma aberrations can be corrected better. These lenses are joined with each other, so that influences of production and composition errors can be reduced and more stable performance can be ensured.

Hereinafter, conditions to ensure better performance of a zoom lens will be described. A first lens group, in order from an object side, preferably includes three lenses, namely, a negative meniscus lens facing its concave surface to an image side, a negative lens and a positive lens. Two negative lenses are placed at an object side of the first lens group, so that an off-axis luminous flux having a large entry angle can be refracted little by little on a total of four surfaces and occurrences of an off-axis aberration can be reduced.

To correct monochromatic aberrations better, a first lens group preferably has equal to or more than one aspheric surface. In particular, either one surface of an image side of the two negative lenses placed at an object side is preferably an aspheric surface. By adopting an aspheric surface at this position, especially a distortion, an astigmatism and so on at a short focal length end are possible to be corrected effectively.

It is preferable that an open diameter of an aperture be invariable in spite of zooming because the mechanism is simplified. However, an open diameter at a long focal length end is larger than at a short focal length end, so that a change of F numbers along with zooming can also be small. When it is necessary to decrease light quantity which reaches an image plane, the diameter of an aperture may be small. However, it is preferable that the way of decreasing light quantity is not by changing the diameter of an aperture greatly but by inserting an ND (Neutral Density) filter and so on, so that lowering of a resolution by refracting phenomenon can be prevented.

Hereinafter, embodiments according to the invention will be explained by using the drawings. FIG. 1 illustrates an embodiment of a zoom lens and is a first embodiment described later. A zoom lens illustrated in FIG. 1, in order from an object side (left side of the drawing), has a first lens group I having a negative refracting power, a second lens group II having a positive refracting power, a third lens group III having a positive refracting power and an aperture S which is placed at an object side of the second lens group II and changes its position integrally with the second lens group II. In this zoom lens, when zooming from a wide-angle end to a telephoto end, as indicated by an arrow, at least the first lens group I and the second lens group II move, so that an interval between the first lens group I and the second lens group II decreases and an interval between the second lens group II and the third lens group III increases. As described later in the first embodiment, glass types of aspheric positive lenses included in the second lens group satisfy conditions (1) and (2).

Figure 2:
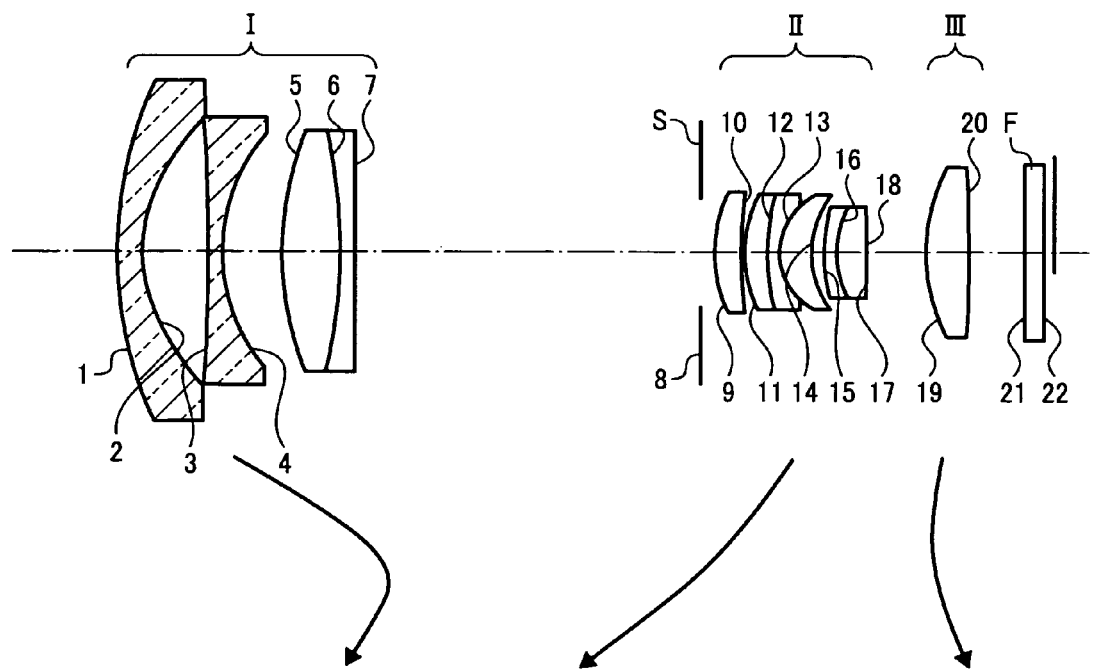
FIG. 2 is a cross-sectional view illustrating a construction of a zoom lens and its displacement along with zooming according to second embodiment.

FIG. 2 is another embodiment of a zoom lens and illustrates a second embodiment described later. A zoom lens illustrated in FIG. 2, in order from an object side (left side of the drawing), has a first lens group I having a negative refracting power, a second lens group II having a positive refracting power, a third lens group III having a positive refracting power and an aperture S which is placed at an object side of the second lens group II and changes its position integrally with the second lens group II. In this zoom lens, when zooming from a wide-angle end to a telephoto end, as indicated by an arrow, at least the first lens group I and the second lens group II move, so that an interval between the first lens group I and the second lens group II decreases and an interval between the second lens group II and the third lens group III increases. As described later in the second embodiment, glass types of aspheric positive lenses included in the second lens group satisfy conditions (1) and (2).

Figure 3:
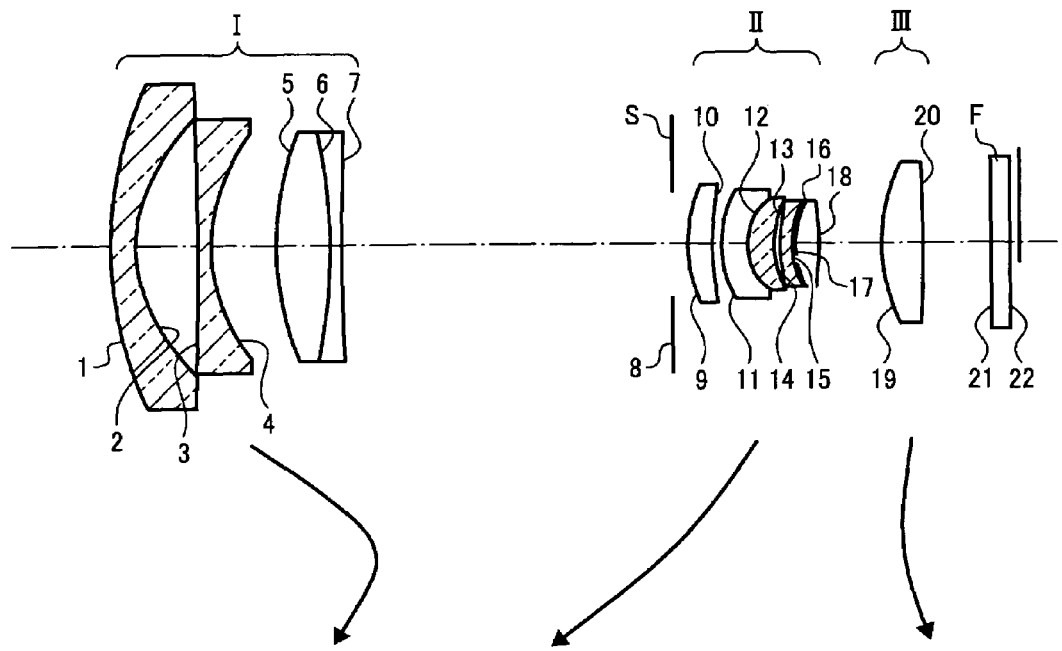
FIG. 3 is a cross-sectional view illustrating a construction of a zoom lens and its displacement along with zooming according to third embodiment.

FIG. 3 is still another embodiment of a zoom lens and illustrates a third embodiment described later. A zoom lens illustrated in FIG. 3, in order from an object side (left side of the drawing), has a first lens group I having a negative refracting power, a second lens group II having a positive refracting power, a third lens group III having a positive refracting power and an aperture S which is placed at an object side of the second lens group II and changes its position integrally with the second lens group II. In this zoom lens, when zooming from a wide-angle end to a telephoto end, as indicated by an arrow, at least the first lens group I and the second lens group II move, so that an interval between the first lens group I and the second lens group II decreases and an interval between the second lens group II and the third lens group III increases. As described later in the third embodiment, glass types of aspheric positive lenses included in the second lens group satisfy conditions (1) and (2).

Figure 4:
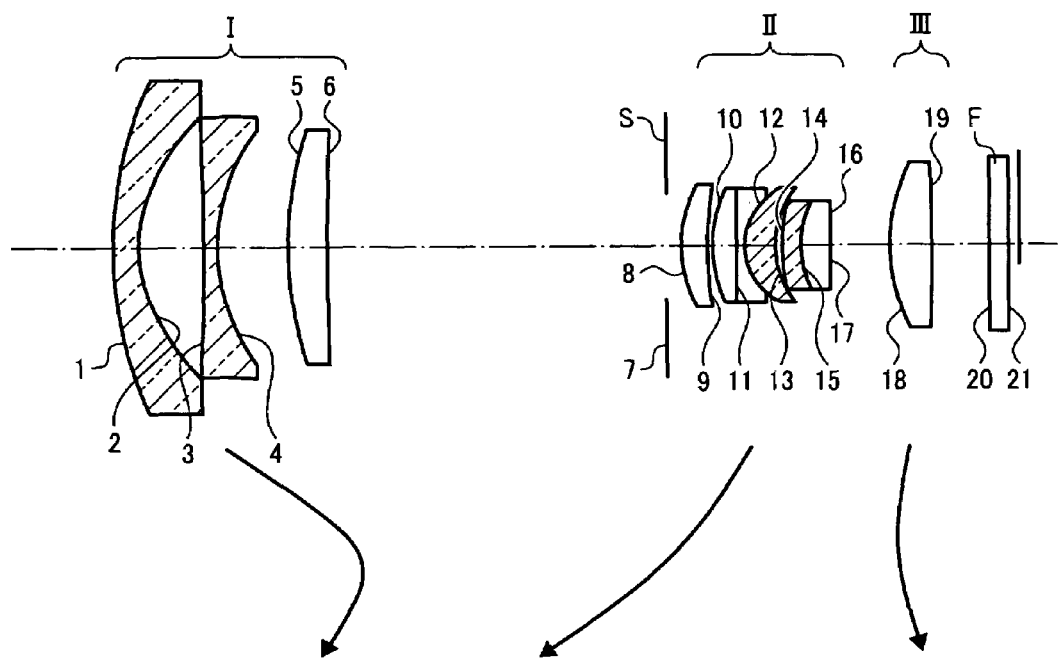
FIG. 4 is a cross-sectional view illustrating a construction of a zoom lens and its displacement along with zooming according to fourth embodiment.

FIG. 4 is still another embodiment of a zoom lens and illustrates a fourth embodiment described later. A zoom lens illustrated in FIG. 4, in order from an object side (left side of the drawing), has a first lens group I having a negative refracting power, a second lens group II having a positive refracting power, a third lens group III having a positive refracting power and an aperture S which is placed at an object side of the second lens group II and changes its position integrally with the second lens group II. In this zoom lens, when zooming from a wide-angle end to a telephoto end, as indicated by an arrow, at least the first lens group I and the second lens group II move, so that an interval between the first lens group I and the second lens group II decreases and an interval between the second lens group II and the third lens group III increases. As described later in the fourth embodiment, glass types of aspheric positive lenses included in the second lens group satisfy conditions (1) and (2). That is, in the first to the fourth embodiments, each of zoom lenses includes three lens groups.

Figure 5:
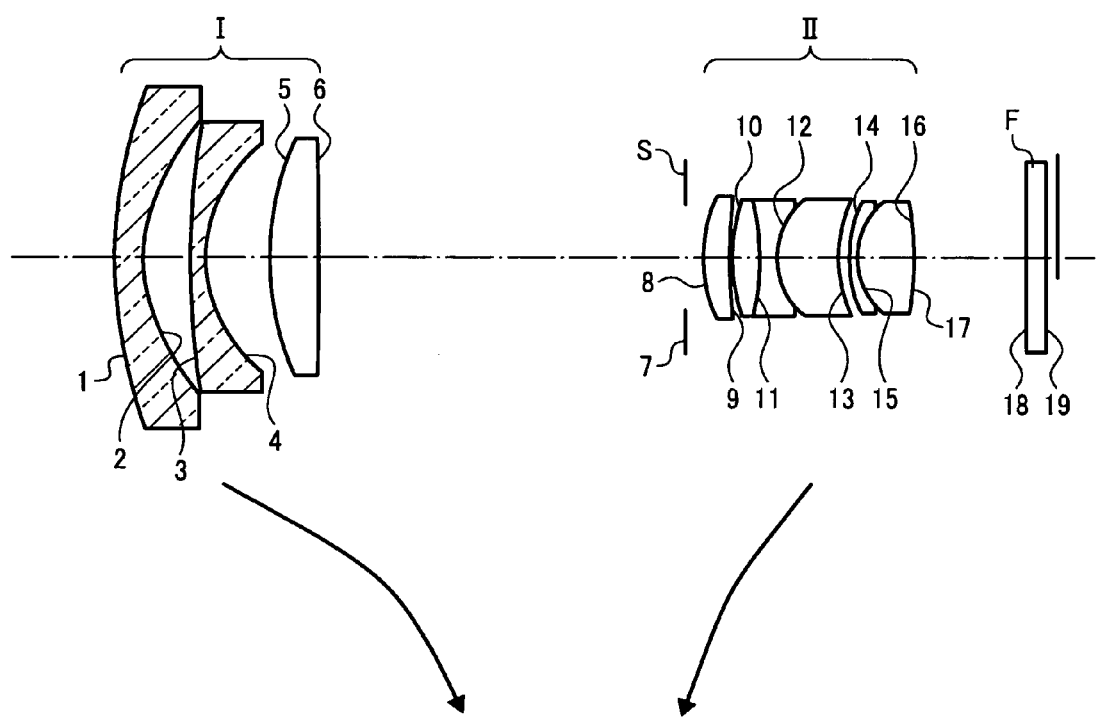
FIG. 5 is a cross-sectional view illustrating a construction of a zoom lens and its displacement along with zooming according to fifth embodiment.

FIG. 5 is still another embodiment of a zoom lens and illustrates a fifth embodiment described later. A zoom lens illustrated in FIG. 5, in order from an object side (left side of the drawing), has a first lens group I having a negative refracting power, a second lens group II having a positive refracting power, and an aperture S which is placed at an object side of the second lens group and changes its position integrally with the second lens group II. This zoom lens, when zooming from a wide angle-end to a telephoto end, as indicated by an arrow, both of the first lens group I and the second lens group II move, so that an interval between the first lens group I and the second lens group II decreases and an interval between the second lens group II and an image plane increases. As described later in the fifth embodiment, glass types of aspheric positive lenses included in the second lens group satisfy conditions (1) and (2). That is, a zoom lens of the fifth embodiment is an example of a zoom lens that is constructed of two lens groups. In addition, in FIGS. 1 to 5, a parallel plate represented as a symbol F describes various filters such as an optical low-pass filter, an infrared cut filter and so on and a cover glass (a sealing glass) of light receiving elements such as a CCD (Charge-Coupled-Device) sensor and so on as a single parallel plate.

Before describing particular embodiments of a zoom lens, an embodiment of a personal digital assistant will be explained. As described in FIGS. 21A to 22, a personal digital assistant 30 has a photographing lens 31 and a light receiving element (an area sensor) 45 as an image sensor. The personal digital assistant 30 has a construction in which a subject image captured by the photographing lens 31 provides an image on the light receiving element 45 and the image can be read by the image sensor 45.

An image pickup apparatus includes the photographing lens 31 and the light receiving element 45. The light receiving element 45 is a color image sensor. As the photographing lens 31, a zoom lens according to an embodiment of the invention, in particular, for example, one of the first to the fifth embodiments as described later is used. As the light receiving element 45, whose number of pixels is 8 to 10 million pixels, for example, a CCD area sensor and the like having a diagonal length of a light receiving area: 9.1 mm, a pixel pitch: 2 μm and number of pixels: about 10 million pixels, are used.

Figure 22:
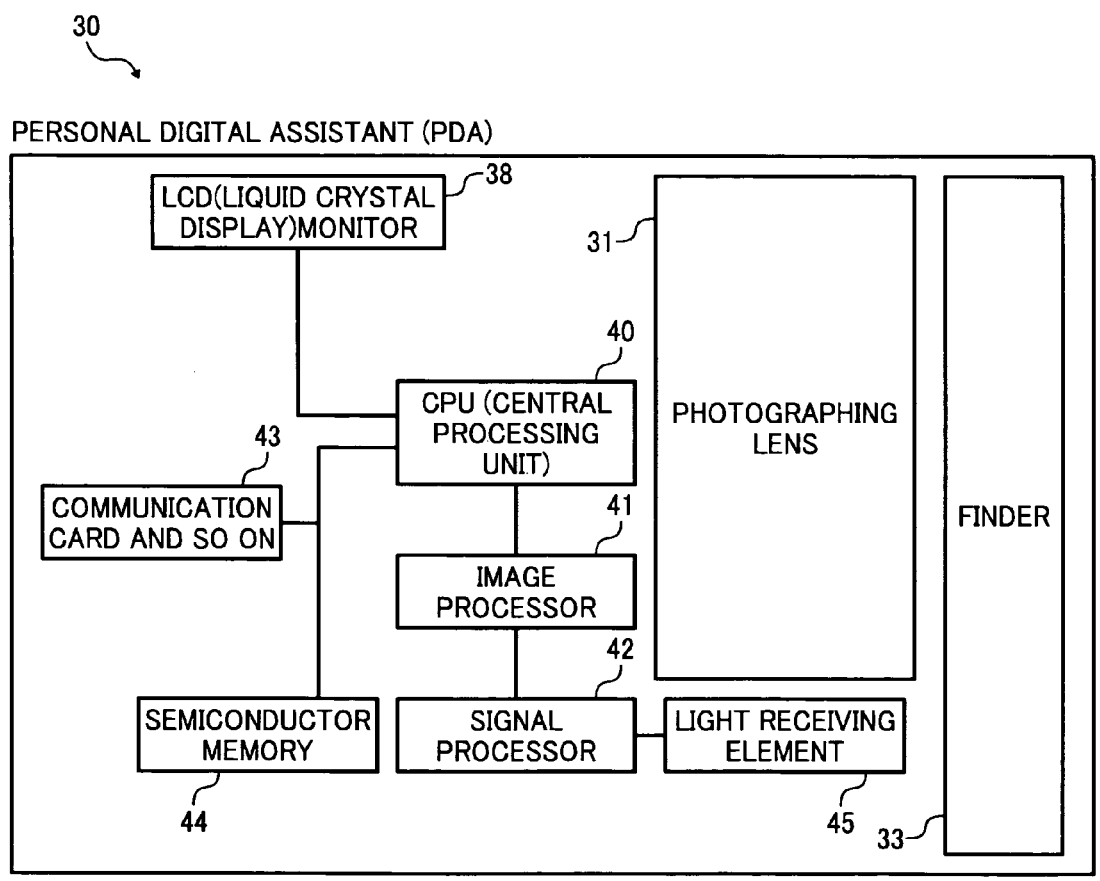
FIG. 22 is a diagram explaining a system of the device of FIGS. 21A to 21C.

As described in FIG. 22, an output from the light receiving element 45 is processed by a signal processor 42 controlled by a CPU (Central Processing Unit) 40 and is converted into digital information. Image information digitalized by the signal processor 42 is recorded in a semiconductor memory 44, after a predetermined image process is performed in an image processor 41 controlled by the CPU 40. An LCD (Liquid Crystal Display) monitor 38 displays a shooting image and also images recorded in the semiconductor memory 44. In addition, images recorded in the semiconductor memory 44 are also possible to be sent to an external device by using a communication card 43 and so on.

Figure 21A:
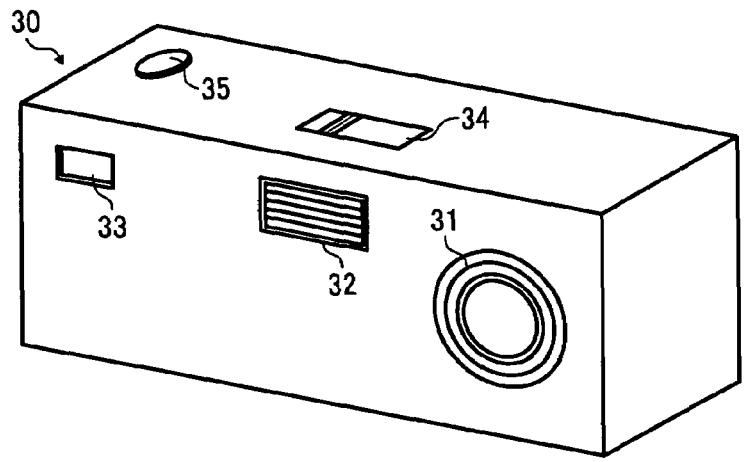
FIG. 21A is a front view of an embodiment of a personal digital assistant (when collapsed.).
Figure 21B:
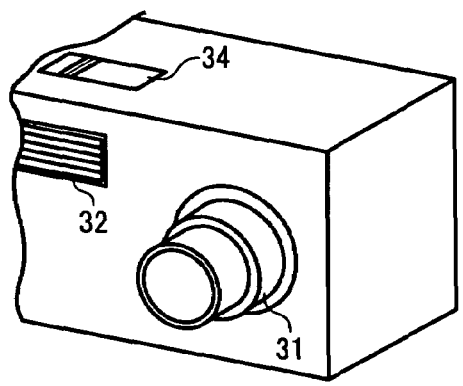
FIG. 21B is the front view of an embodiment of the personal digital assistant (when power-on.).
Figure 21C:
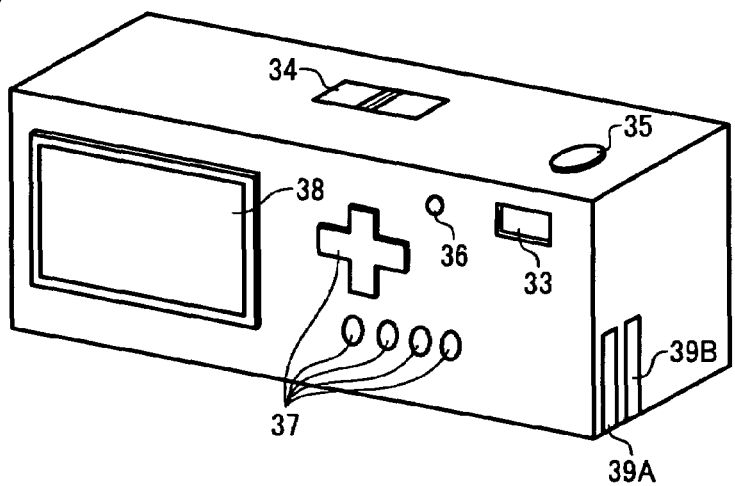
FIG. 21C is a rear view of an embodiment of the personal digital assistant.

As described in FIG. 21A, the photographing lens 31 is at a collapsed state when the device is carried. When a user turns a power switch 36 on, as described in FIG. 21B, a lens barrel is extended out. In this case, each group of a zoom lens inside the lens barrel, for example, is arranged at a short focal length end. An arrangement of each group is changed by a zoom lever 34 operation and this makes a zooming to a long focal length end possible. Then, a finder 33 also changes its magnification ratio along with changes of field angles of the photographing lens 31.

Focusing is done by a half press of a shutter button 35. When a zoom lens of the first to the fifth embodiments is used, focusing is done by movement of the third lens group or movement of the light receiving element 45. Photographing is done by pressing the shutter button 35 fully and then the image information process as described above is done. A numeral 32 is a flash.

By operating an operation button 37, the images recorded in the semiconductor memory 44 can be displayed on the LCD monitor 38 or are sent to an external device by using the communication card 43 and so on. The semiconductor memory 44, the communication card 43 and the like are inserted respectively into an exclusive or a general slot 39A and 39B and are used.

When the photographing lens 31 is at a collapsed state, each group of the zoom lens does not always need to line on an optical axis. For example, if a mechanism is such that the third lens group, the fourth lens group and the fifth lens group are off the optical axis and are stored parallel to the other lens groups, the personal digital assistant is possible to be thinner.

Hereinafter, four particular examples of a zoom lens according to an embodiment of the invention will be described. In all of the embodiments, the maximum image height is 4.70 mm. In each embodiment, meanings of symbols are described below.

| | |
|---|---|
| f: | a focal length of whole system |
| F: | F number |
| ω: | a half field angle |
| R: | a curvature radius |
| D: | an inter-facial spacing |
| $N_d$: | a refracting index |
| $v_d$: | an Abbe's number |
| K: | a conic constant of an aspheric surface |
| $A_4$: | 4th order aspheric coefficient |
| $A_6$: | 6th order aspheric coefficient |
| $A_8$: | 8th order aspheric coefficient |
| $A_{10}$: | 10th order aspheric coefficient |
| $A_{12}$: | 12th order aspheric coefficient |
| $A_{14}$: | 14th order aspheric coefficient |
| $A_{16}$: | 16th order aspheric coefficient |
| $A_{18}$: | 18th order aspheric coefficient |

When an inverse number of a paraxial curvature radius (a paraxial curvature) is D, a height from an optical axis is H, a conic constant is K, aspheric coefficients are A4, A6, A8 . . . . The shape of an aspheric surface is described as a well-known expression:

$$X = CH^2/\{1+\sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

X is a length of a perpendicular line drawn from a point on an aspheric surface of a height from an optical axis: H to a tangent plane at an aspheric vertex (a perpendicular plane to an optical axis).

For example, OHARA Inc. products and Sumita optical Glass Inc. products are used as optical glass. Names of glass types are product names of each company.

First Embodiment f=5.204~14.996, F=2.66~4.67, ω=43.26~17.51

| Surface No. | R | D | $N_d$ | $v_d$ | $\Delta\theta_{g,F}$ | name of glass type |
|---|---|---|---|---|---|---|
| 01 | 24.422 | 1.60 | 1.73310 | 48.89 | −0.0093 | OHARA L-LAM72 |
| 02* | 9.225 | 4.11 | | | | |
| 03 | −180.153 | 1.20 | 1.77250 | 49.60 | −0.0092 | OHARA S-LAH66 |
| 04 | 11.584 | 4.10 | | | | |
| 05 | 20.498 | 3.55 | 1.80100 | 34.97 | 0.0015 | OHARA S-LAM66 |
| 06 | −34.360 | 1.00 | 1.75700 | 47.82 | −0.0076 | OHARA S-LAM54 |
| 07 | 232.236 | variable (A) | | | | |
| 08 | An aperture | 1.00 | | | | |
| 09* | 8.821 | 1.56 | 1.77250 | 49.60 | −0.0092 | OHARA S-LAH66 |
| 10 | 22.899 | 0.10 | | | | |
| 11 | 7.072 | 1.45 | 1.80440 | 39.59 | −0.0045 | OHARA S-LAH63 |
| 12 | 11.355 | 0.70 | 1.80100 | 34.97 | 0.0015 | OHARA S-LAM66 |
| 13 | 3.897 | 2.25 | 1.48749 | 70.24 | 0.0022 | OHARA S-FSL5 |
| 14 | 6.572 | 0.33 | | | | |
| 15 | 11.142 | 0.60 | 1.74950 | 35.28 | 0.0025 | OHARA S-LAM7 |
| 16 | 4.205 | 2.13 | 1.49700 | 81.54 | 0.0280 | OHARA S-FPL51 |
| 17* | −100.000 | variable (B) | | | | |
| 18 | 12.952 | 2.50 | 1.43875 | 94.94 | 0.0461 | OHARA S-FPL53 |
| 19* | −153.191 | variable (C) | | | | |
| 20 | ∞ | 1.24 | 1.51680 | 64.20 | | Various filters |
| 21 | ∞ | | | | | |

(Aspheric Surfaces)

"*" symbols are given to aspheric surfaces. The following embodiments are the same as above.

(Second Surface)
K=0.0,
$A_4 = -1.28414 \times 10^{-4}$, $A_6 = -6.57446 \times 10^{-7}$, $A_8 = -6.30308 \times 10^{-9}$,
$A_{10} = -1.72874 \times 10^{-10}$, $A_{12} = -2.57252 \times 10^{-12}$, $A_{14} = 2.13910 \times 10^{-14}$,
$A_{16} = 7.39915 \times 10^{-16}$, $A_{18} = -1.13603 \times 10^{-17}$ (9th Surface)
K=0.0,
$A_4 = -7.05273 \times 10^{-5}$, $A_6 = 5.04003 \times 10^{-7}$, $A_8 = -6.78678 \times 10^{-8}$,
$A_{10} = 1.47308 \times 10^{-9}$ (17th Surface)
K=0.0,
$A_4 = 4.43634 \times 10^{-5}$, $A_6 = 1.20686 \times 10^{-5}$, $A_8 = -4.69301 \times 10^{-6}$,
$A_{10} = 1.28473 \times 10^{-7}$ (19th Surface)
K=0.0,
$A_4 = 6.54212 \times 10^{-5}$, $A_6 = -8.10291 \times 10^{-6}$, $A_8 = 1.98320 \times 10^{-7}$,
$A_{10} = -2.19065 \times 10^{-9}$ (Variable Quantity)

|   | Short focal length end f = 5.20 | Middle focal length f = 8.83 | Long focal length end f = 15.00 |
|---|---|---|---|
| A | 21.349 | 7.868 | 1.825 |
| B | 3.669 | 7.448 | 17.837 |
| C | 4.009 | 4.883 | 2.771 |

(Parameter Values of Condition)
Parameters of conditions (1) and (2) are described in the data described above. They apply to the following embodiments in the same manner.
dS-A/dS-L=1.00
fA/f2=0.555
A hybrid aspheric lens is not used for the first embodiment, therefore conditions (5) and (6) are not applicable.

Second Embodiment f=5.201~14.992, F=2.61~4.55, ω=43.30~17.52

| Surface No. | R | D | $N_d$ | $\nu_d$ | $\Delta\theta_{g,F}$ | Name of glass type |
|---|---|---|---|---|---|---|
| 01 | 24.778 | 1.60 | 1.73310 | 48.89 | −0.0093 | OHARA L-LAM72 |
| 02* | 9.258 | 4.13 | | | | |
| 03 | −135.512 | 0.90 | 1.77250 | 49.60 | −0.0092 | OHARA S-LAH66 |
| 04 | 11.450 | 3.68 | | | | |
| 05 | 20.052 | 3.62 | 1.80100 | 34.97 | 0.0015 | OHARA S-LAM66 |
| 06 | −31.678 | 0.80 | 1.75700 | 47.82 | −0.0076 | OHARA S-LAM54 |
| 07 | 575.312 | variable(A) | | | | |
| 08 | An aperture | 1.00 | | | | |
| 09* | 8.059 | 1.70 | 1.77250 | 49.60 | −0.0092 | OHARA S-LAH66 |
| 10 | 33.197 | 0.23 | | | | |
| 11 | 8.347 | 1.41 | 1.74320 | 49.34 | −0.0085 | OHARA S-LAM60 |
| 12 | 15.124 | 0.74 | 1.80100 | 34.97 | 0.0015 | OHARA S-LAM66 |
| 13 | 4.000 | 1.97 | 1.48749 | 70.24 | 0.0022 | OHARA S-FSL5 |
| 14 | 5.836 | 0.81 | | | | |
| 15 | 11.591 | 0.76 | 1.69895 | 30.13 | 0.0103 | OHARA S-TIM35 |
| 16 | 6.099 | 1.80 | 1.43875 | 94.94 | 0.0461 | OHARA S-FPL53 |
| 17 | −83.437 | 0.04 | 1.52000 | 52.00 | | A resin layer |
| 18* | −92.525 | variable(B) | | | | |
| 19 | 11.393 | 2.77 | 1.43875 | 94.94 | 0.0461 | OHARA S-FPL53 |
| 20* | −173.335 | variable(C) | | | | |
| 21 | ∞ | 1.24 | 1.51680 | 64.20 | | Various filters |
| 22 | ∞ | | | | | |

(Aspheric Surfaces)

(Second Surface)
K=0.0,
$A_4=-1.35800\times10^{-4}$, $A_6=-6.92172\times10^{-7}$, $A_8=-6.14443\times10^{-9}$,
$A_{10}=-1.43503\times10^{-10}$,
$A_{12}=-3.48101\times10^{-12}$, $A_{14}=2.10140\times10^{-14}$,
$A_{16}=9.10457\times10^{-16}$,
$A_{18}=-1.22550\times10^{-17}$ (9th Surface)
K=0.0,
$A_4=-1.07511\times10^{-4}$, $A_6=-2.17978\times10^{-7}$, $A_8=-6.37972\times10^{-8}$,
$A_{10}=9.25387\times10^{-10}$ (18th Surface)
K=0.0,
$A_4=9.82250\times10^{-5}$, $A_6=2.14093\times10^{-5}$, $A_8=-4.33536\times10^{-6}$,
$A_{10}=2.17218\times10^{-7}$ (20th Surface)
K=0.0,
$A_4=1.17631\times10^{-4}$, $A_6=-9.65391\times10^{-6}$, $A_8=2.41593\times10^{-7}$,
$A_{10}=-2.63773\times10^{-9}$ (Variable Quantity)

|   | Short focal length end f = 5.20 | Middle focal length f = 8.83 | Long focal length end f = 14.99 |
|---|---|---|---|
| A | 21.522 | 8.000 | 1.810 |
| B | 3.665 | 7.592 | 17.621 |
| C | 3.514 | 4.348 | 2.830 |

(Parameter Values of Condition)

dS-A/dS-L=1.00
fA/f2=0.884
tR/tA=0.0217
rB/rA=0.902

Third Embodiment f=5.204~15.004, F=2.64~4.66, ω=43.27~17.52

| Surface No. | R | D | $N_d$ | $\nu_d$ | $\Delta\theta_{g,F}$ | Name of glass type |
|---|---|---|---|---|---|---|
| 01 | 25.388 | 1.60 | 1.73310 | 48.89 | −0.0093 | OHARA L-LAM72 |
| 02* | 9.192 | 4.03 | | | | |
| 03 | −284.803 | 0.90 | 1.77250 | 49.60 | −0.0092 | OHARA S-LAH66 |
| 04 | 11.799 | 4.27 | | | | |
| 05 | 20.868 | 3.43 | 1.80100 | 34.97 | 0.0015 | OHARA S-LAM66 |
| 06 | −34.927 | 0.80 | 1.75700 | 47.82 | −0.0076 | OHARA S-LAM54 |
| 07 | 206.277 | variable(A) | | | | |
| 08 | An aperture | 1.00 | | | | |
| 09* | 8.032 | 1.65 | 1.79952 | 42.22 | −0.0060 | OHARA S-LAH52 |
| 10 | 22.923 | 0.57 | | | | |
| 11 | 7.349 | 1.69 | 1.78470 | 26.29 | 0.0146 | OHARA S-TIH23 |
| 12 | 3.790 | 1.74 | 1.48749 | 70.24 | 0.0022 | OHARA S-FSL5 |
| 13 | 6.487 | 0.44 | | | | |
| 14 | 15.189 | 0.75 | 1.74950 | 35.28 | 0.0025 | OHARA S-LAM7 |
| 15 | 6.168 | 0.16 | | | | |
| 16* | 6.977 | 0.12 | 1.52000 | 52.00 | | A resin layer |
| 17 | 6.589 | 1.50 | 1.43875 | 94.94 | 0.0461 | OHARA S-FPL53 |
| 18 | −22.660 | variable(B) | | | | |
| 19 | 12.659 | 2.72 | 1.43875 | 94.94 | 0.0461 | OHARA S-FPL53 |
| 20* | −112.732 | variable(C) | | | | |
| 21 | ∞ | 1.24 | 1.51680 | 64.20 | | Various filters |
| 22 | ∞ | | | | | |

(Aspheric Surface)

(Second Surface)
K=0.0,
$A_4$=−1.36863×10$^{-4}$, $A_6$=−6.47708×10$^{-7}$, $A_8$=−7.35880×10$^{-9}$,
$A_{10}$=−1.35479×10$^{-10}$, $A_{12}$=−3.38913×10$^{-12}$, $A_{14}$=2.21060×10$^{-14}$,
$A_{16}$=9.07422×10$^{-6}$, $A_{18}$=−1.29112×10$^{-17}$ (9th Surface)
K=0.0,
$A_4$=−9.88713×10$^{-5}$, $A_6$=−2.55374×10$^{-7}$, $A_8$=−7.80472×10$^{-8}$,
$A_{10}$=1.69652×10$^{-9}$ (16th Surface)
K=0.0,
$A_4$=−4.03962×10$^{-5}$, $A_6$=5.78224×10$^{-6}$, $A_8$=1.51452×10$^{-6}$,
$A_{10}$=−1.25128×10$^{-8}$ (20th Surface)
K=0.0,
$A_4$=3.98967×10$^{-5}$, $A_6$=−5.16113×10$^{-6}$, $A_8$=1.10338×10$^{-7}$,
$A_{10}$=1.01513×10$^{-9}$ (Variable Quantity)

| | Short focal length end f = 5.20 | Middle focal length f = 8.84 | Long focal length end f = 15.00 |
|---|---|---|---|
| A | 21.350 | 7.748 | 1.828 |
| B | 4.087 | 8.347 | 19.430 |
| C | 4.321 | 5.093 | 2.815 |

(Parameter Values of Condition)
dS-A/dS-L=0.832
fA/f2=0.811
tR/tA=0.0741
rB/rA=0.944

Fourth Embodiment f=5.206~15.006, F=2.58~4.49, ω=43.27~17.47

| Surface No. | R | D | $N_d$ | $\nu_d$ | $\Delta\theta_{g,F}$ | Name of glass type |
|---|---|---|---|---|---|---|
| 01 | 24.439 | 1.60 | 1.73310 | 48.89 | −0.0093 | OHARA L-LAM72 |
| 02* | 9.047 | 4.04 | | | | |
| 03 | −208.323 | 0.90 | 1.74400 | 44.79 | −0.0035 | OHARA S-LAM2 |
| 04 | 12.228 | 4.35 | | | | |
| 05 | 22.021 | 2.42 | 1.80518 | 25.42 | 0.0158 | OHARA S-TIH6 |
| 06 | 250.000 | variable(A) | | | | |
| 07 | An aperture | 1.00 | | | | |
| 08* | 7.935 | 1.64 | 1.79952 | 42.22 | −0.0060 | OHARA S-LAH52 |
| 09 | 25.546 | 0.28 | | | | |
| 10 | 7.796 | 1.54 | 1.80610 | 40.93 | −0.0052 | OHARA S-LAH53 |
| 11 | −205.340 | 0.50 | 1.85000 | 32.40 | 0.0039 | SUMITA K-LaSFn21 |
| 12 | 4.000 | 1.95 | 1.48749 | 70.24 | 0.0022 | OHARA S-FSL5 |
| 13 | 5.774 | 0.39 | | | | |
| 14 | 10.938 | 1.17 | 1.68893 | 31.07 | 0.0092 | OHARA S-TIM28 |
| 15 | 6.023 | 1.80 | 1.43875 | 94.94 | 0.0461 | OHARA S-FPL53 |
| 16 | −56.695 | 0.08 | 1.52000 | 52.00 | | A resin layer |
| 17* | −59.395 | variable(B) | | | | |

-continued

| Surface No. | R | D | $N_d$ | $v_d$ | $\Delta\theta_{g,F}$ | Name of glass type |
|---|---|---|---|---|---|---|
| 18 | 11.698 | 2.64 | 1.43875 | 94.94 | 0.0461 | OHARA S-FPL53 |
| 19* | −225.859 | variable(C) | | | | |
| 20 | ∞ | 1.24 | 1.51680 | 64.20 | | Various filters |
| 21 | ∞ | | | | | |

(Aspheric Surface)

(Second Surface)
K=0.0,
$A_4=-1.30875\times10^{-4}$, $A_6=-6.16199\times10^{-7}$, $A_8=-9.33434\times10^{-9}$,
$A_{10}=-1.13135\times10^{-10}$, $A_{12}=-3.64254\times10^{-12}$, $A_{14}=2.18018\times10^{-14}$,
$A_{16}=9.66843\times10^{-16}$, $A_{18}=-1.47933\times10^{-17}$ (8th Surface)
K=0.0,
$A_4=-9.42018\times10^{-5}$, $A_6=1.48563\times10^{-7}$, $A_8=-9.08707\times10^{-8}$,
$A_{10}=2.14140\times10^{-9}$ (17th Surface)
K=0.0,
$A_4=1.48391\times10^{-4}$, $A_6=2.15451\times10^{-5}$, $A_8=-4.41154\times10^{-6}$,
$A_{10}=2.28669\times10^{-7}$ (19th Surface)
K=0.0,
$A_4=1.35253\times10^{-4}$, $A_6=-8.89107\times10^{-6}$, $A_8=1.65638\times10^{-7}$,
$A_{10}=-1.21325\times10^{-9}$ (Variable Quantity)

| | Short focal length end f = 5.21 | Middle focal length f = 8.84 | Long focal length end f = 15.01 |
|---|---|---|---|
| A | 21.161 | 7.897 | 1.822 |
| B | 3.661 | 7.342 | 17.177 |
| C | 3.498 | 4.405 | 2.848 |

(Parameter Values of Condition)

dS-A/dS-L=1.00
fA/f2=0.871
tR/tA=0.0444
rB/rA=0.955

Fifth Embodiment f=5.200~12.492, F=2.84~3.96, ω=43.22~20.63

| Surface No. | R | D | $N_d$ | $v_d$ | $\Delta\theta_{g,F}$ | Name of glass type |
|---|---|---|---|---|---|---|
| 01 | 27.986 | 1.60 | 1.73310 | 48.89 | −0.0093 | OHARA L-LAM72 |
| 02* | 9.245 | 2.67 | | | | |
| 03 | 47.734 | 0.90 | 1.77250 | 49.60 | −0.0092 | OHARA S-LAH66 |
| 04 | 8.311 | 3.60 | | | | |
| 05 | 16.509 | 2.79 | 1.71736 | 29.52 | 0.0110 | OHARA S-TIH1 |
| 06* | 250.000 | variable(A) | | | | |
| 07 | An aperture | 1.00 | | | | |
| 08* | 7.987 | 1.54 | 1.79952 | 42.22 | −0.0060 | OHARA S-LAH52 |
| 09 | 35.368 | 0.16 | | | | |
| 10 | 10.446 | 1.57 | 1.77250 | 49.60 | −0.0092 | OHARA S-LAH66 |
| 11 | −13.557 | 0.96 | 1.83400 | 37.16 | −0.0037 | OHARA S-LAH60 |
| 12 | 4.260 | 3.53 | 1.49700 | 81.54 | 0.0280 | OHARA S-FPL51 |
| 13 | 7.834 | 0.59 | | | | |
| 14 | 6.809 | 0.50 | 1.73400 | 51.47 | −0.0096 | OHARA S-LAL59 |
| 15 | 4.128 | 3.24 | 1.43875 | 94.94 | 0.0461 | OHARA S-FPL53 |
| 16 | −19.373 | 0.04 | 1.52000 | 52.00 | | A resin layer |
| 17* | −19.770 | variable(B) | | | | |
| 18 | ∞ | 1.24 | 1.51680 | 64.20 | | Various filters |
| 19 | ∞ | | | | | |

(Aspheric Surfaces)

(Second Surface)
K=0.0,
$A_4=-1.23905\times10^{-4}$, $A_6=-2.67726\times10^{-6}$, $A_8=1.13346\times10^{-8}$,
$A_{10}=-7.07042\times10^{-11}$, $A_{12}=-4.31642\times10^{-12}$, $A_{14}=1.17946\times10^{-14}$,
$A_{16}=9.29475\times10^{-16}$, $A_{18}=-1.19738\times10^{-17}$ (6th Surface)
K=0.0,
$A_4=-3.05548\times10^{-5}$, $A_6=1.71370\times10^{-7}$, $A_8=-2.16113\times10^{-8}$,
$A_{10}=9.03382\times10^{-11}$ (8th Surface)
K=0.0,
$A_4=-9.07935\times10^{-5}$, $A_6=2.92706\times10^{-7}$, $A_8=-1.23507\times10^{-7}$,
$A_{10}=5.11168\times10^{-9}$ (17th Surface)

K=0.0, $A_4=2.07163\times10^{-4}$, $A_6=4.32738\times10^{-6}$, $A_8=-1.9072\times10^{-6}$, $A_{10}=1.13689\times10^{-8}$ (Variable Quantity)

|   | Short focal length end f = 5.20 | Middle focal length f = 8.06 | Long focal length end f = 12.49 |
|---|---|---|---|
| A | 21.075 | 9.408 | 1.879 |
| B | 6.431 | 8.997 | 12.976 |

(Parameter Values of Condition)

dS−A/dS−L=1.00 fA/f2=0.656 tR/tA=0.0122 rB/rA=1.020

Figure 10:
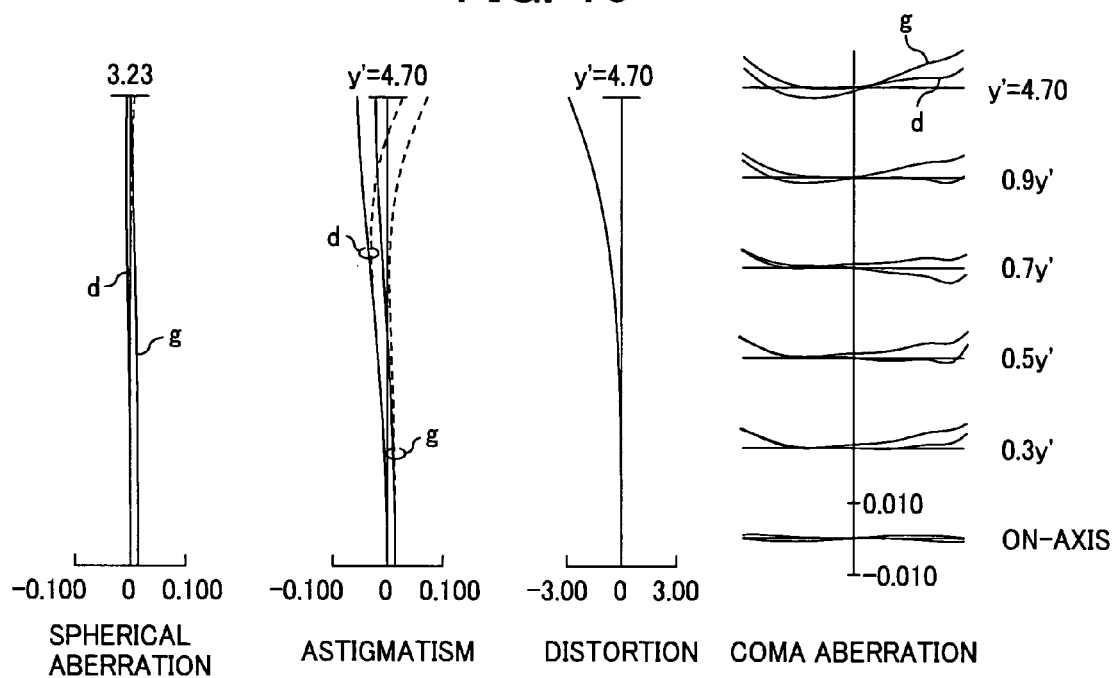
FIG. 10 is an aberration diagram at a middle focal length according to the second embodiment.
Figure 11:
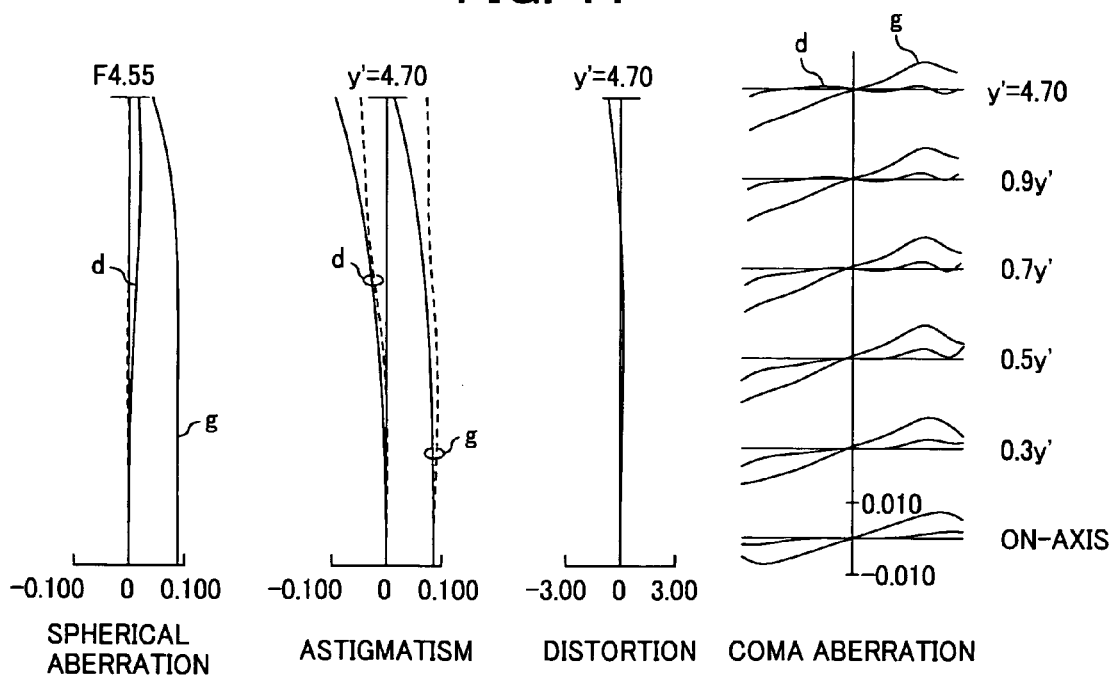
FIG. 11 is an aberration diagram at a long focal length end according to the second embodiment.
Figure 12:
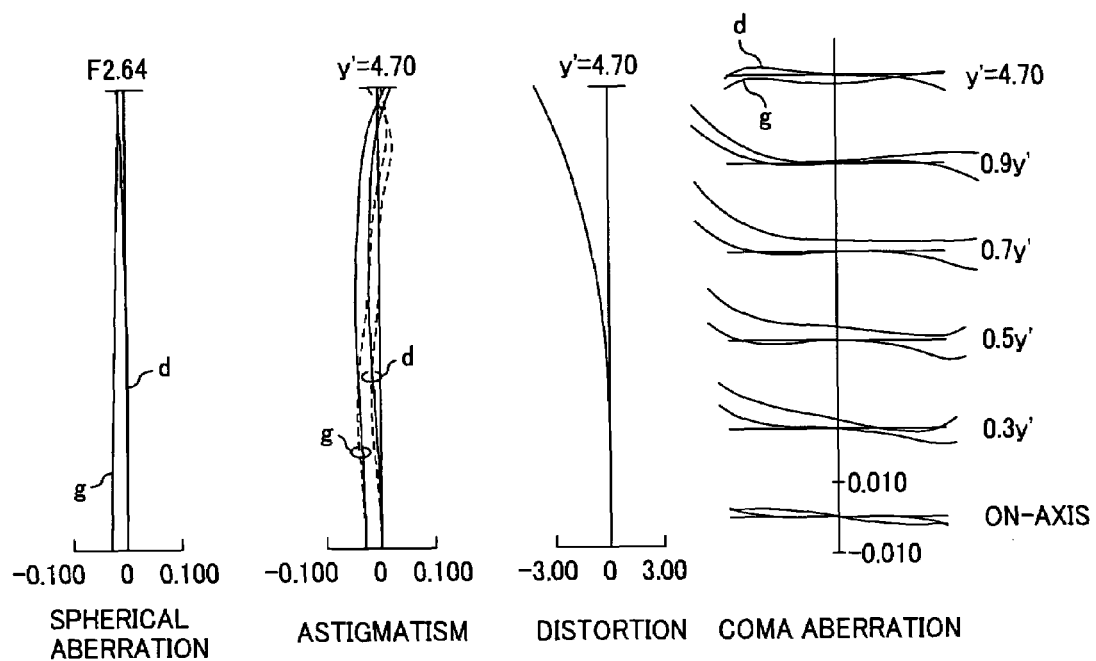
FIG. 12 is an aberration diagram at a short focal length end according to the third embodiment.
Figure 13:
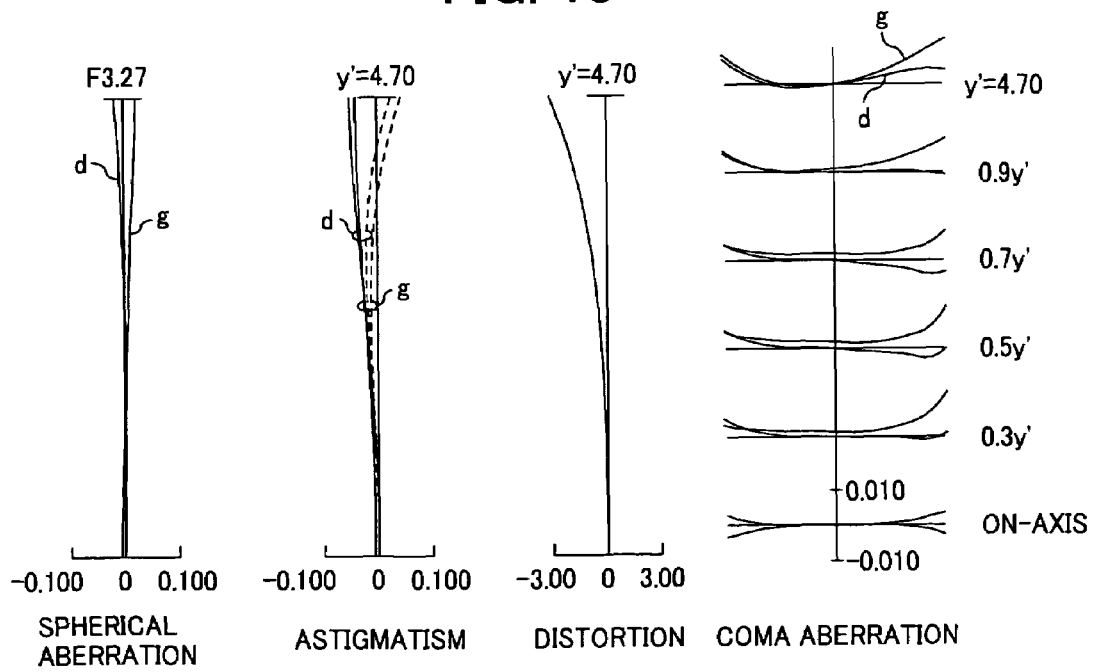
FIG. 13 is an aberration diagram at a middle focal length according to the third embodiment.
Figure 14:
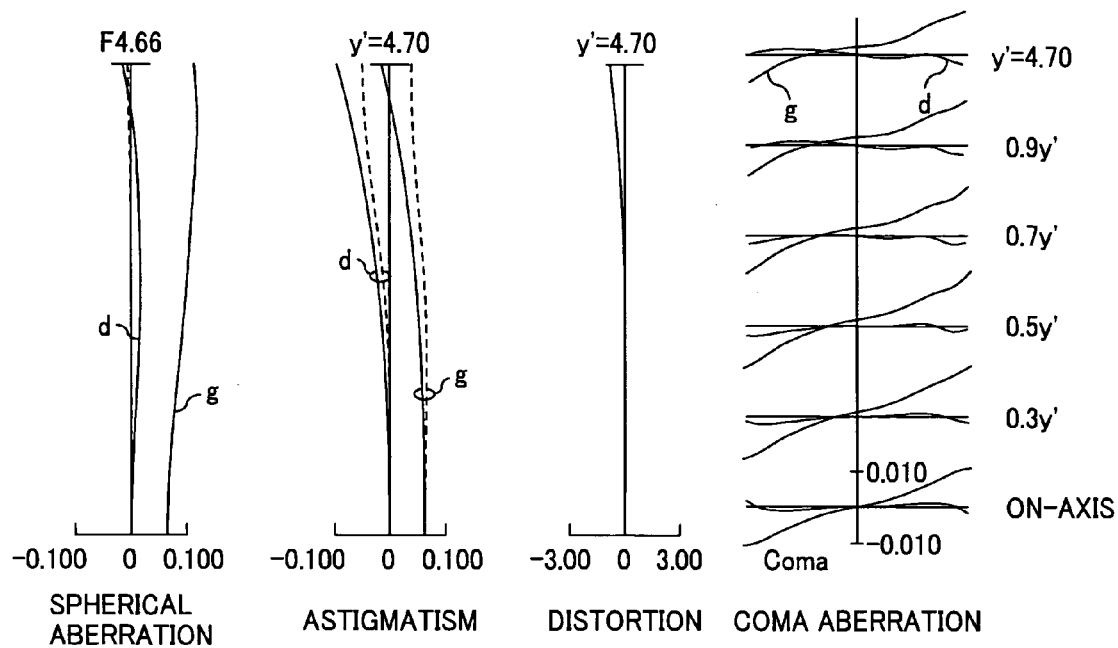
FIG. 14 is an aberration diagram at a long focal length end according to the third embodiment.
Figure 15:
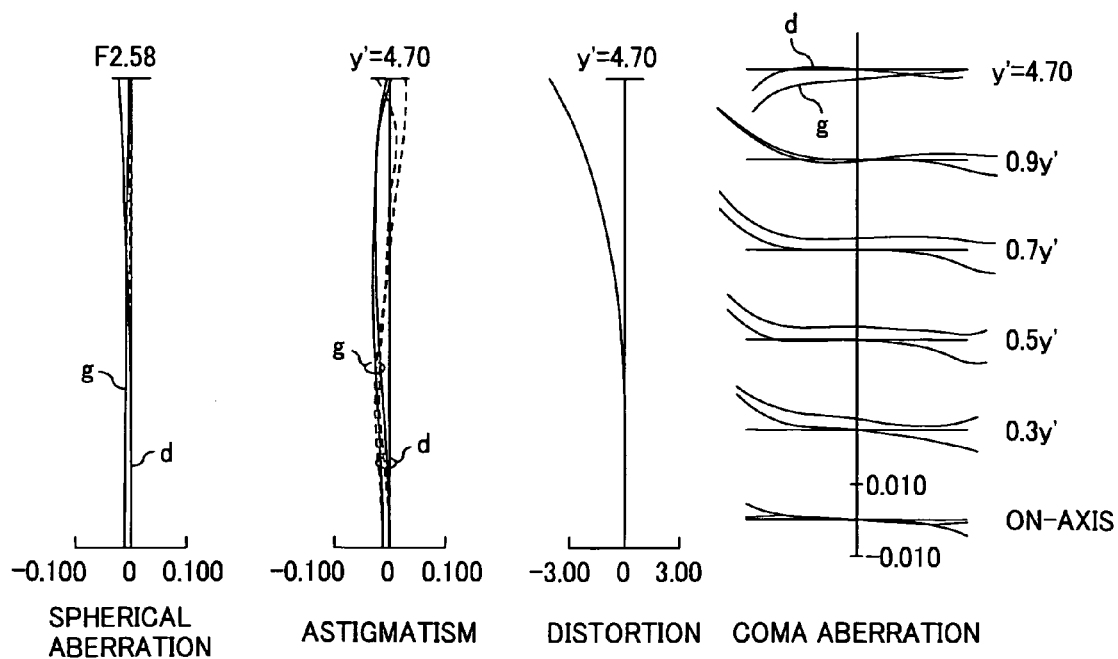
FIG. 15 is an aberration diagram at a short focal length end according to the fourth embodiment.
Figure 16:
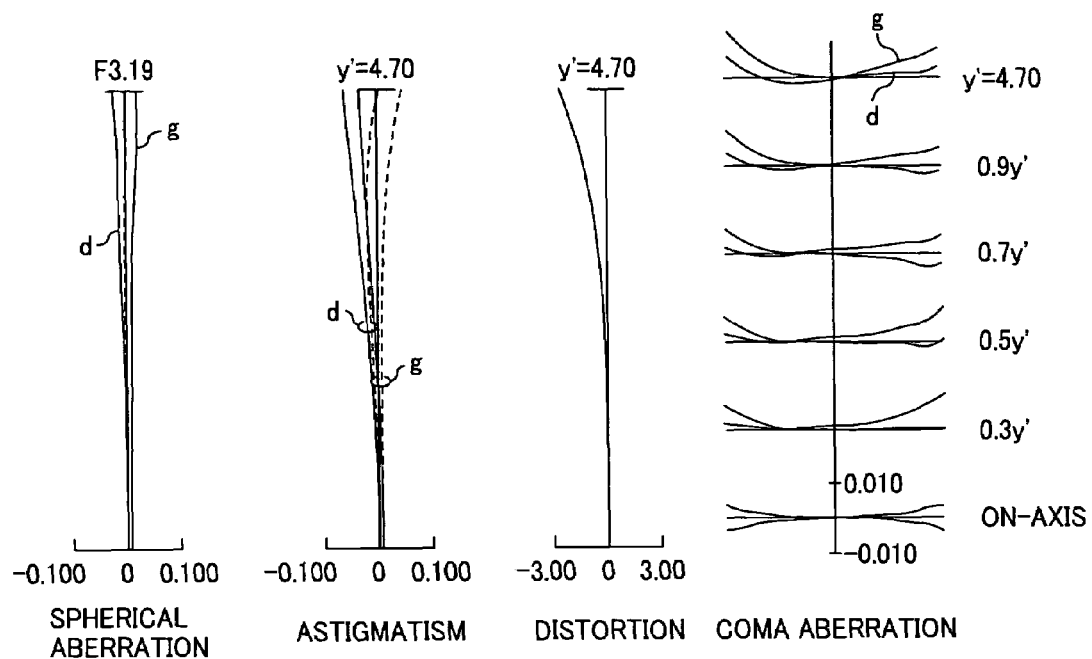
FIG. 16 is an aberration diagram at a middle focal length according to the fourth embodiment.
Figure 17:
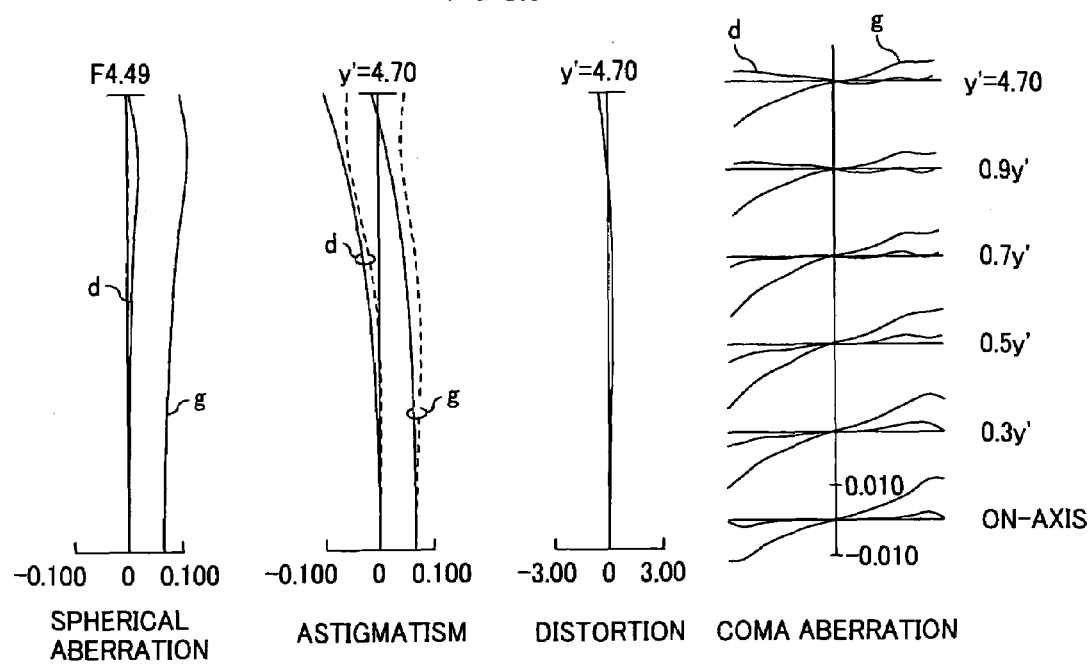
FIG. 17 is an aberration diagram at a long focal length end according to the fourth embodiment.
Figure 18:
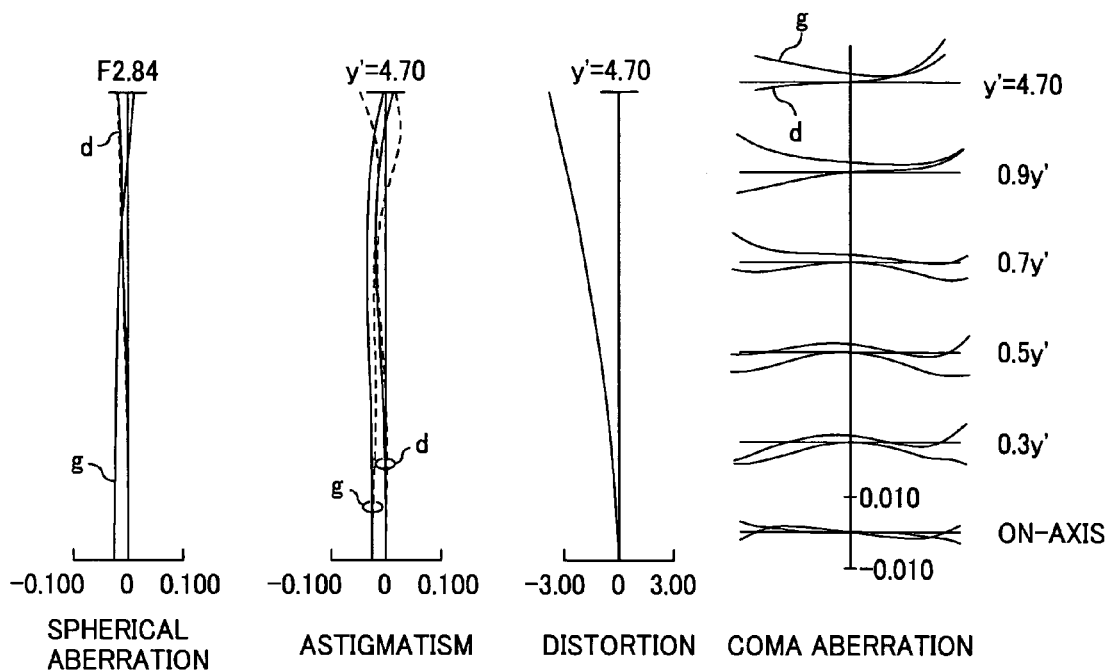
FIG. 18 is an aberration diagram at a short focal length end according to the fifth embodiment.
Figure 19:
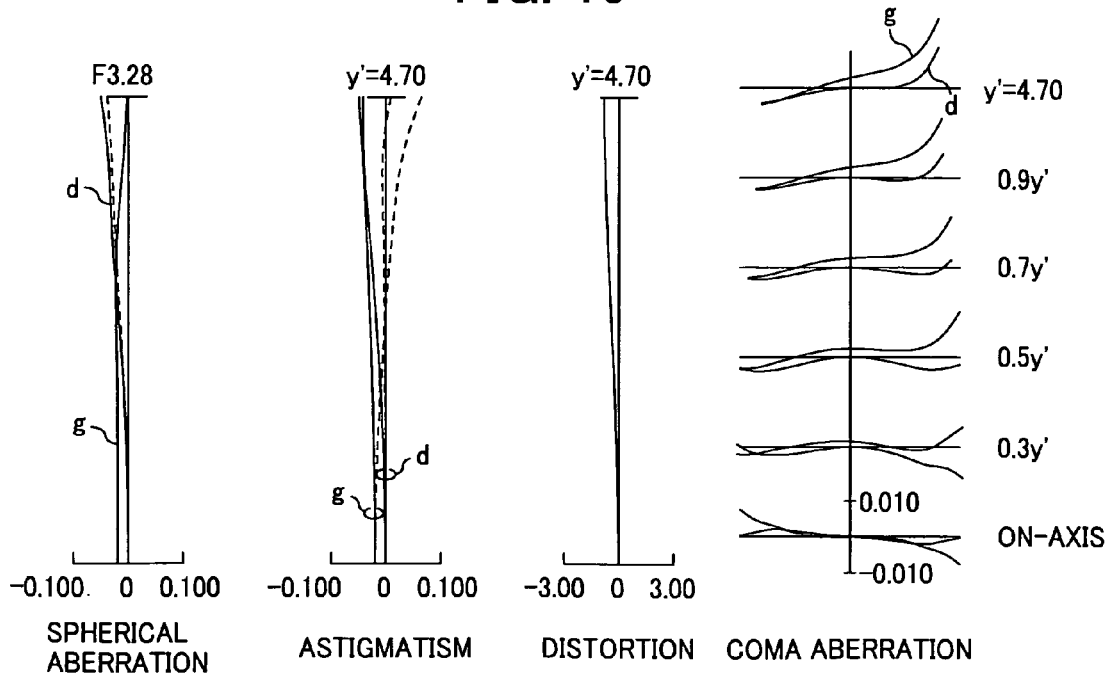
FIG. 19 is an aberration diagram at a middle focal length according to the fifth embodiment.
Figure 20:
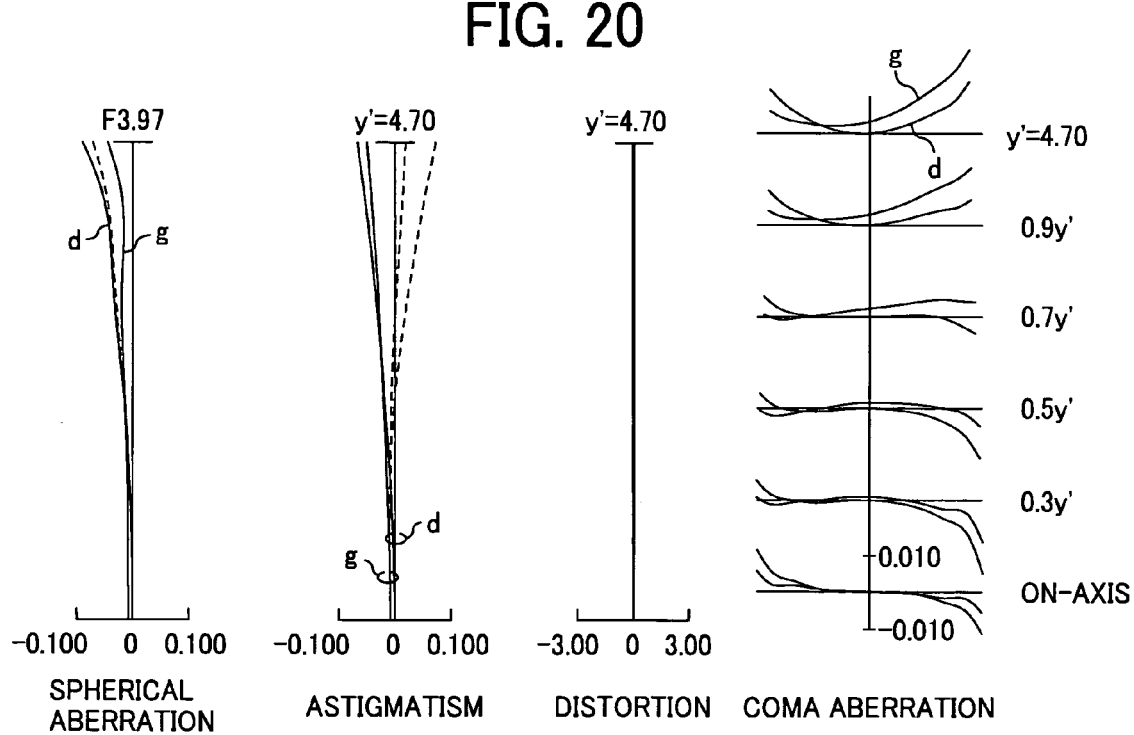
FIG. 20 is an aberration diagram at a long focal length end according to the fifth embodiment.

FIGS. 6 to 8 are aberration diagrams regarding the first embodiment. FIG. 6 illustrates an aberration diagram at a short focal length end (a wide-angle end), FIG. 7 illustrates an aberration diagram at a middle focal length and FIG. 8 illustrates an aberration diagram at a long focal length end (a telephoto end). A dashed line in diagrams of spherical aberration describes a sine condition. A solid line in diagrams of astigmatism describes a sagittal image surface and a dashed line describes a meridional image surface. These apply to aberration diagrams of the other embodiments in the same manner. FIGS. 9 to 11 describe aberration diagrams regarding the second embodiment. FIG. 9 illustrates an aberration diagram at a short focal length end (a wide-angle end), FIG. 10 illustrates an aberration diagram at a middle focal length and FIG. 11 illustrates an aberration diagram at a long focal length end (a telephoto end). FIGS. 12 to 14 describe aberration diagrams regarding the third embodiment. FIG. 12 illustrates an aberration diagram at a short focal length end (a wide-angle end), FIG. 13 illustrates an aberration diagram at a middle focal length and FIG. 14 illustrates an aberration diagram at a long focal length end (a telephoto end). FIGS. 15 to 17 describe aberration diagrams regarding the fourth embodiment. FIG. 15 illustrates an aberration diagram at a short focal length end (a wide-angle end), FIG. 16 illustrates an aberration diagram at a middle focal length and FIG. 17 illustrates an aberration diagram at a long focal length end (a telephoto end). FIGS. 18 to 20 describe aberration diagrams regarding the fifth embodiment. FIG. 18 illustrates an aberration diagram at a short focal length end (a wide-angle end), FIG. 19 illustrates an aberration diagram at a middle focal length and FIG. 20 illustrates an aberration diagram at a long focal length end (a telephoto end). In each embodiment, aberrations are corrected enough and each embodiment is capable of corresponding to 8 to 10 million pixels or more of a receiving light element.

According to an embodiment of the invention, the novel zoom lens, the novel image pickup apparatus and the novel personal digital assistant are achieved. By providing a zoom lens according to an embodiment of the invention, as described in embodiments, aberrations are corrected well and a half field angle at a wide-angle end of the zoom lens becomes equal to or more than 42 degrees and also becomes a wide field angle enough, and at the same time it achieves close to three times of a zooming ratio and also a resolution corresponding to an image sensor having 8 to 10 million pixels or more.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens, comprising:

a first lens group having a negative refracting power;

a second lens group having a positive refracting power, and including at least three positive lenses and two negative lenses in which at least one of the three positive lenses is an aspheric positive lens; and an aperture provided on an object side of the second lens group and which moves integrally with the second lens group, the first lens group and the second lens group being arranged in this order from the object side to an image side, and at least the first lens group and the second lens group being moved when zooming from a wide-angle end to a telephoto end is performed, such that an interval between the first lens group and the second lens group is reduced, and an interval between the second lens group and an image plane is increased, wherein an Abbe's number $v_d$ and an anomalous dispersion $\Delta\theta_{g,F}$ of a glass type of the at least one aspheric positive lens of the three positive lenses of the second lens group satisfy the following conditions, respectively:

$$v_d>80.0 \quad (1)$$

$$\Delta\theta_{g,F}>0.025 \quad (2)$$

where $n_g$ is a refracting index to a g-line, $n_F$ is a refracting index to an F-line, $n_c$ is a refracting index to a c-line, $v_d$ is the Abbe's number, and $\Delta\theta_{g,F}$ is the anomalous dispersion, wherein a relative partial dispersion $\theta_{g,F}$ is defined by a condition:

$$\theta_{g,F}=(n_g-n_F)/(n_F-n_c)$$

wherein the anomalous dispersion $\Delta\theta_{g,F}$ is defined as a deflection from a reference line on a two-dimensional coordinate surface, wherein the two-dimensional coordinate surface is defined by a plane including two perpendicular axes in which the relative partial dispersion $\theta_{g,F}$ is a longitudinal axis and in which the Abbe's number $v_d$ is a lateral axis thereof, and wherein the reference line is defined by a straight line connecting coordinate points ($v_d$=60.49, $\theta_{g,F}$=0.5432) of a reference glass type K7 and coordinate points ($v_d$=36.26, $\theta_{g,F}$=0.5830) of a reference glass type F2.

2. The zoom lens according to claim 1, further comprising a third lens group having a positive refracting power and provided on the image side of the second lens group, wherein at least the first lens group and the second lens group are moved when the zooming from the wide-angle end to the telephoto end is performed, such that the interval between the first lens group and the second lens group is reduced, and an interval between the second lens group and the third lens group is increased.

3. The zoom lens according to claim 2, wherein the third lens group includes one positive lens.

4. The zoom lens according to claim 3, wherein the one positive lens of the third lens group is an aspheric positive lens, and an Abbe's number $v_d$ and anomalous dispersion $\Delta\theta_{g,F}$ of a glass type of the aspheric positive lens of the one positive lens satisfy the conditions, respectively:

$$\nu_d > 80.0 \quad (1)$$

$$\Delta\theta_{g,F} > 0.025 \quad (2).$$

5. The zoom lens according to claim 1, wherein a distance dS–L on an optical axis from the aperture stop to a surface in the second lens group which is nearest to the image side, and a distance dS–A on the optical axis from the aperture to an aspheric surface in the second lens group which is nearest to the image side, satisfy a condition:

$$0.75 < dS\text{--}A/dS\text{--}L \leq 1.0 \quad (3).$$

6. The zoom lens according to claim 1, wherein a focal length f2 of the second lens group, and a focal length fA of an aspheric surface of the second lens group on the image side, satisfy a condition:

$$0.4 < fA/f2 < 1.0 \quad (4).$$

7. The zoom lens according to claim 1, wherein the aspheric positive lens including the glass type, which satisfies the conditions (1) and (2), has a resin layer on at least one of optical surfaces thereof, and is a hybrid aspheric lens in which an air contact surface of the resin layer forms a shape of an aspheric surface.

8. The zoom lens according to claim 7, wherein a center thickness tA of the entire hybrid aspheric lens, and a center thickness tR of the resin layer satisfy a condition:

$$0.01 < tR/tA < 0.1 \quad (5).$$

9. The zoom lens according to claim 7, wherein a paraxial curvature radius rA of the aspheric surface as the air contact surface of the resin layer in the hybrid aspheric lens, and a curvature radius rB of a spherical surface where the resin layer is formed, satisfy a condition:

$$0.5 < rB/rA < 1.4 \quad (6).$$

10. The zoom lens according to claim 1, wherein the second lens group further comprises at least one aspheric lens, besides the aspheric positive lens including the glass type which satisfies the conditions (1) and (2).

11. The zoom lens according to claim 10, wherein the at least one aspheric positive lens is disposed in a position in the second lens group nearest to the image side, and the at least one aspheric lens is disposed in a position in the second lens group nearest to the object side.

12. The zoom lens according to claim 1, wherein the at least one aspheric positive lens is disposed in a position in the second lens group nearest to the image side, and is cemented with the negative lens which is disposed on the object side thereof and disposed adjacent thereto.

13. The zoom lens according to claim 1, having a resolution corresponding to an image sensor including 8 to 10 million pixels or more, and wherein a half-field angle in the wide-angle end is equal to or more than 42 degrees.

14. An image pickup apparatus, comprising a zoom lens, as a photographing zoom lens, including:
 a first lens group having a negative refracting power;
 a second lens group having a positive refracting power, and including at least three positive lenses and two negative lenses in which at least one of the three positive lenses is an aspheric positive lens; and
 an aperture provided on an object side of the second lens group and which moves integrally with the second lens group,
 the first lens group and the second lens group being arranged in this order from the object side to an image side, and
 at least the first lens group and the second lens group being moved when zooming from a wide-angle end to a telephoto end is performed, such that an interval between the first lens group and the second lens group is reduced, and an interval between the second lens group and an image plane is increased,
 wherein an Abbe's number $\nu_d$ and an anomalous dispersion $\Delta\theta_{g,F}$ of a glass type of the at least one aspheric positive lens of the three positive lenses of the second lens group satisfy the following conditions, respectively:

$$\nu_d > 80.0 \quad (1)$$

$$\Delta\theta_{g,F} > 0.025 \quad (2)$$

where $n_g$ is a refracting index to a g-line, $n_F$ is a refracting index to an F-line, $n_c$ is a refracting index to a c-line, $\nu_d$ is the Abbe's number, and $\Delta\theta_{g,F}$ is the anomalous dispersion, wherein a relative partial dispersion $\theta_{g,F}$ is defined by a condition:

$$\theta_{g,F} = (n_g - n_F)/(n_F - n_c)$$

wherein the anomalous dispersion $\Delta\theta_{g,F}$ is defined as a deflection from a reference line on a two-dimensional coordinate surface, wherein the two-dimensional coordinate surface is defined by a plane including two perpendicular axes in which the relative partial dispersion $\theta_{g,F}$ is a longitudinal axis and in which the Abbe's number $\nu_d$ is a lateral axis thereof, and wherein the reference line is defined by a straight line connecting coordinate points ($\nu_d = 60.49$, $\theta_{g,F} = 0.5432$) of a reference glass type K7 and coordinate points ($\nu_d = 36.26$, $\theta_{g,F} = 0.5830$) of a reference glass type F2.

15. The image pickup apparatus according to claim 14, wherein a color image sensor is used as an image sensor.

16. The image pickup apparatus according to claim 15, having a resolution corresponding to the image sensor including 8 to 10 million pixels or more, and wherein a half-field angle in the wide-angle end is equal to or more than 42 degrees.

17. A personal digital assistant, comprising an image pickup apparatus including a zoom lens, as a photographing zoom lens, having:
 a first lens group having a negative refracting power;
 a second lens group having a positive refracting power, and including at least three positive lenses and two negative lenses in which at least one of the three positive lenses is an aspheric positive lens; and
 an aperture provided on an object side of the second lens group and which moves integrally with the second lens group,
 the first lens group and the second lens group being arranged in this order from the object side to an image side, and
 both of the first lens group and the second lens group being moved when zooming from a wide-angle end to a telephoto end is performed, such that an interval between the first lens group and the second lens group is reduced, and an interval between the second lens group and an image plane is increased,
 wherein an Abbe's number $\nu_d$ and an anomalous dispersion $\Delta\theta_{g,F}$ of a glass type of the at least one aspheric positive lens of the three positive lenses of the second lens group satisfy the following conditions, respectively:

$$v_d > 80.0 \quad (1)$$

$$\Delta\theta_{g,F} > 0.025 \quad (2)$$

where $n_g$ is a refracting index to a g-line, $n_F$ is a refracting index to an F-line, $n_c$ is a refracting index to a c-line, $v_d$ is the Abbe's number, and $\Delta\theta_{g,F}$ is the anomalous dispersion, wherein a relative partial dispersion $\theta_{g,F}$ is defined by a condition:

$$\theta_{g,F} = (n_g - n_F)/(n_F - n_c)$$

wherein the anomalous dispersion $\Delta\theta_{g,F}$ is defined as a deflection from a reference line on a two-dimensional coordinate surface, wherein the two-dimensional coordinate surface is defined by a plane including two perpendicular axes in which the relative partial dispersion $\theta_{g,F}$ is a longitudinal axis and in which the Abbe's number $v_d$ is a lateral axis thereof, and wherein the reference line is defined by a straight line connecting coordinate points ($v_d$=60.49, $\theta_{g,F}$=0.5432) of a reference glass type K7 and coordinate points ($v_d$=36.26, $\theta_{g,F}$=0.5830) of a reference glass type F2.

* * * * *